United States Patent
Shiraishi et al.

(10) Patent No.: US 6,926,828 B2
(45) Date of Patent: Aug. 9, 2005

(54) FLUID FILTER

(75) Inventors: Teruo Shiraishi, Anjo (JP); Fuminori Horio, Anjo (JP)

(73) Assignee: INOAC Corporation, Aichi (JP)

(\*) Notice: Subject to any disclaimer, the term of this patent is extended or adjusted under 35 U.S.C. 154(b) by 141 days.

(21) Appl. No.: 10/349,862

(22) Filed: Jan. 23, 2003

(65) Prior Publication Data

US 2003/0141240 A1 Jul. 31, 2003

(30) Foreign Application Priority Data

Jan. 25, 2002 (JP) ........................................ 2002-017624
Jan. 31, 2002 (JP) ........................................ 2002-024053
Jul. 26, 2002 (JP) ........................................ 2002-218889

(51) Int. Cl.$^7$ ............................................. B01D 39/16
(52) U.S. Cl. ........................ 210/310; 210/350; 210/453; 210/455; 210/496; 55/482; 55/485; 55/486; 55/487; 55/488; 55/DIG. 42
(58) Field of Search ........................ 210/226, 299–301, 210/310, 350–352, 453, 455, 496, 510.1, DIG. 5; 55/485–488, 509, DIG. 13, DIG. 42, 428, 482

(56) References Cited

U.S. PATENT DOCUMENTS

| 136,364 | A | \* | 3/1873 | Conger | ........................ 210/264 |
| 2,857,927 | A | \* | 10/1958 | Pardee | ........................ 137/549 |
| 3,108,866 | A | \* | 10/1963 | Saunders | ........................ 55/480 |
| 3,572,509 | A | \* | 3/1971 | Dexter | ........................ 210/130 |
| 3,935,111 | A | | 1/1976 | Bentley | |
| 5,690,825 | A | | 11/1997 | Parton | |

FOREIGN PATENT DOCUMENTS

| EP | 0 240 342 | 10/1987 |
| EP | 0 806 475 | 11/1997 |
| EP | 0 928 617 | 7/1999 |

\* cited by examiner

Primary Examiner—Matthew O. Savage
(74) Attorney, Agent, or Firm—Koda & Androlia

(57) ABSTRACT

A fluid filter is provided with a case body defining therein a holder and having pressing portions formed on the internal wall surface of the case body. The pressing portions can compress a filter medium housed in the holder. The pressing portions are pressed against the filter medium housed in the holder to compress it and form a compressed region at a desired position of the filter medium, where the rate of capturing extraneous substances is increased. Thus, even if various sizes of the extraneous substances are contained in a fluid introduced through the inlet into the holder, the filter medium can capture the extraneous substances in its entirety. The degree of compression of the compressed region in the filter medium changes depending on the height of each pressing portion.

7 Claims, 23 Drawing Sheets

FLUID FILTER

BACKGROUND OF THE INVENTION

1. Field of the Invention

The present invention relates to a fluid filter. More particularly, the present invention relates to a fluid filter provided with a case body and a filter medium; the case body having an inlet and an outlet for a fluid at required positions respectively and also a holder defined therein to communicate with the inlet and outlet; the filter medium being made of a porous material having an appropriate flexibility and a uniform density and being removably housed in the holder. A fluid introduced through the inlet into the holder is allowed to pass through the filter medium where fine extraneous substances contained in the fluid are captured, and the resulting purified fluid is discharged through the outlet.

2. Description of the Related Art

As shown in FIG. 23, many of air purifiers, automobile engines, hydraulic cylinders and various kinds of other apparatuses which utilize gaseous bodies such as air and other gases or liquids such as oils (the gaseous bodies and liquids are hereinafter referred generally to as "fluids") each have a fluid filter FL attached to a fluid inlet M1 of the apparatus M of interest so as to capture fine extraneous substances contained in the fluid and purify it. Various modes and kinds of fluid filters FL have been developed and are put into practical uses, and an example of which is shown in FIG. 24. The fluid filter FL shown in FIG. 24 is provided with a filter case (case body) 60 and a filter medium 70. The filter case 60 has an inlet 62 and an outlet 64 for a fluid at required positions respectively and also has a holder 66 defined therein to communicate with the inlet 62 and the outlet 64. The filter medium 70 is made of a porous material having an appropriate flexibility and a uniform density and is removably housed in the holder 66. A fluid introduced through the inlet 62 into the holder 66 is allowed to pass through the filter medium 70 where fine extraneous substances S contained in the fluid are captured, and the resulting purified fluid is discharged through the outlet 64.

Here, there can be suitably utilized the so-called porous materials containing a multiplicity of pores (air gaps) including synthetic resin open-cell foams such as sponge and urethane foam having open-cell structures, nonwoven fabrics, fiber assemblies, etc. as the filter medium 70. However, mode of dispersion and pressure loss vary depending on the density (size and number of air gaps) of the filter medium 70 to influence the rate of capturing extraneous substances S contained in the fluid. For example, FIG. 24 shows in structural cross-sectional view a fluid filter FL employing a filter medium 70 of a uniform density made of a low-density porous material (the so-called coarse porous material with a large air gap size), whereas FIG. 25 shows in structural cross-sectional view a fluid filter FL employing a filter medium 70 of a uniform density made of a high-density porous material (the so-called fine porous material with a small air gap size).

In the fluid filter FL shown in FIG. 24, the entire filter medium 70 is of uniformly coarse cells, so that it enjoys merits that it can reduce pressure loss and that extraneous substances S can be captured by the filter medium 70 in its entirety in a suitably dispersed state. However, it involves a problem that extraneous substances S smaller than the air gaps are not captured but pass through the filter medium 70, resulting in the failure of securely achieving purification of the fluid. On the other hand, in the fluid filter FL shown in FIG. 25, the entire filter medium 70 is of uniformly fine cells, so that it can capture very fine extraneous substances S. However, the filter medium 70 involves problems that it increases the pressure loss and that various sizes of extraneous substances S are captured massively at the region of the filter medium 70 facing the inlet 62, so that the filter medium 70 fails to capture various sizes of extraneous substances S in its entirety and undergoes clogging soon.

Under such circumstances, there have already been proposed and put into practical uses fluid filters FL for capturing various sizes of extraneous substances S effectively, as shown in FIGS. 26 and 27, respectively. Each fluid filter FL contains a combination of a first filter medium 70A made of a low-density or coarse porous material and a second filter medium 70B made of a fine porous material which is of higher density than the first filter medium 70A to capture larger extraneous substances S and smaller extraneous substances S with the first filter medium 70A and the second filter medium 70B, respectively. In such a fluid filter FL, the first filter medium 70A and the second filter medium 70B are set in a holder 66 of a filter case 60 on the inlet 62 side and on the outlet 64 side, respectively, to enable the filter medium 70 to capture various sizes of extraneous substances S in a suitably dispersed state.

However, the use of at least two kinds of filter mediums 70(70A and 70B) of different densities requires operations of shaping each filter medium 70 into a required shape and a required size, leading to cost increase, disadvantageously. In addition, since the density of the filter medium 70 changes abruptly at the boundary between the first filter medium 70A and the second filter medium 70B, most of the extraneous substances S failed to be captured by the first filter medium 70A are captured massively on the external surface of the second filter medium 70B, so that extraneous substances S cannot be captured by each filter medium 70A(70B) throughout it. In addition, the pressure Loss cannot be minimized. Thus, the fluid filter FL still involves problems to be solved so as to improve the capturing rate.

More specifically, the conventional fluid filters FL shown in FIGS. 24 and 25 and the improved fluid filters FL illustrated in FIGS. 26 and 27 are totally devoid of the technical idea of taking advantage of the properties of the porous material that; it can easily be deformed partly by compression and that the density of the porous material can be varied freely depending on the degree of compression of the compressed region to improve the capturing rate of the filter medium 70. For example, in the fluid filters FL shown in FIGS. 24 and 25, since the filter medium 70 is designed to have an external profile conforming to the internal profile of the holder 66, as shown in FIG. 28, the filter medium 70 is not compressed at all but is housed and retained as such in the holder 66. Thus, each filter medium 70 as a whole has a uniform density, and there is a limit in improving the capturing rate, as described above. Further, in the improved fluid filters FL shown in FIGS. 26 and 27, the first filter medium 70A and the second filter medium 70B are combined and together assume an external profile conforming to the internal profile of the holder 66, as shown in FIGS. 29 and 30, so that the filter mediums 70A and 70B are not compressed at all but are housed and retained as such in the holder 66. Thus, each filter medium 70A(70B) as a whole has a uniform density, so that there is a limit in improving the capturing rate, as explained above.

Meanwhile, in the conventional fluid filters FL and the improved fluid filters FL shown in FIGS. 24 to 27, the filter medium 70 (70A, 70B) to be housed in the holder 66 is designed to conform to the spatial profile of the holder 66 so as to form substantially no clearance (space) around the filter medium 70 housed in the holder 66. Thus, the fluid introduced through the inlet 62 into the holder 66 entirely flows constantly through the filter medium 70 until it is discharged through the outlet 64, so that extraneous substances S contained in the fluid are completely captured by the filter medium 70 and are retained as trapped therein. Therefore, when the fluid filter FL is utilized for purification of a fluid containing many extraneous substances, clogging of the filter medium 70 occurs relatively soon to shorten the cycle of replacing or cleaning the filter medium 70, giving rise to problems that the filter medium 70 must be replaced or cleaned frequently and that the running cost rises.

SUMMARY OF THE INVENTION

The present invention proposed in view of the problems inherent in the prior art described above and with a view to solving them well is directed to providing a fluid filter having a case body and a filter medium housed in a holder defined in the case body, in which the filter medium is suitably compressed to form as desired a compressed region where the rate of capturing extraneous substances is increased so that the filter medium can capture extraneous substances of various sizes in its entirety and that the cycle of replacing or cleaning the filter medium is extended to achieve reduction of running cost.

In order to solve the problems described above and to attain the intended objective, the fluid filter according to the present invention is provided with a case body and a filter medium; the case body having an inlet and an outlet for a fluid at necessary positions respectively and containing a holder defined therein to communicate with the inlet and the outlet; the filter medium being made of a porous material having an appropriate flexibility and a uniform density and being removably housed in the holder so as to allow the fluid introduced through the inlet into the holder to pass through the filter medium where fine extraneous substances contained in the fluid are captured and to discharge the thus cleaned fluid through the outlet; and is characterized in that the case body contains pressing portions formed on an internal wall surface of the case body, the pressing portions being capable of compressing the filter medium housed in the holder; the pressing portions being pressed against the filter medium housed in the holder to compress it and form as desired a compressed region having an increased rate of capturing extraneous substances, enabling the filter medium to capture the extraneous substances throughout the filter medium even if the extraneous substances differ in size.

In order to solve the problems described above and to attain the intended objective likewise, the fluid filter according to the present invention is provided with a case body and a filter medium; the case body having an inlet and an outlet for a fluid at necessary positions respectively and containing a holder defined therein to communicate with the inlet and the outlet; the filter medium being made of a porous material having an appropriate flexibility and a uniform density and being removably housed in the holder so as to allow the fluid introduced through the inlet into the holder to pass through the filter medium where fine extraneous substances contained in the fluid are captured and to discharge the thus cleaned fluid through the outlet; and is characterized in that the filter medium to be housed in the holder is designed to have outside dimensions such that the volume thereof is greater than the internal volume of the holder, so that the filter medium is compressed when it is housed in the holder and form a compressed region having an increased rate of capturing the extraneous substances at a desired position of the filter medium and that the extraneous substances of various sizes are captured by the filter medium in its entirety.

Other aspects and advantages of the invention will become apparent from the following description, taken in conjunction with the accompanying drawings illustrated by way of examples the principles of the invention.

BRIEF DESCRIPTION OF THE DRAWINGS

The invention, together with the objects and advantages thereof, may best be understood by reference to the following description of the presently preferred embodiments together with the accompanying drawings in which.

DETAILED DESCRIPTION OF THE PREFERRED EMBODIMENTS

Next, the fluid filter according to the present invention will be described below by way of preferred embodiments referring to the attached drawings. It should be noted here that, for easier understanding of the present invention, the liquid filters in the following embodiments are illustrated to have the same configuration as those of the conventional fluid filters FL and improved fluid filters FL shown in FIGS. 24 to 27, respectively.

(First Embodiment)

Figure 1:
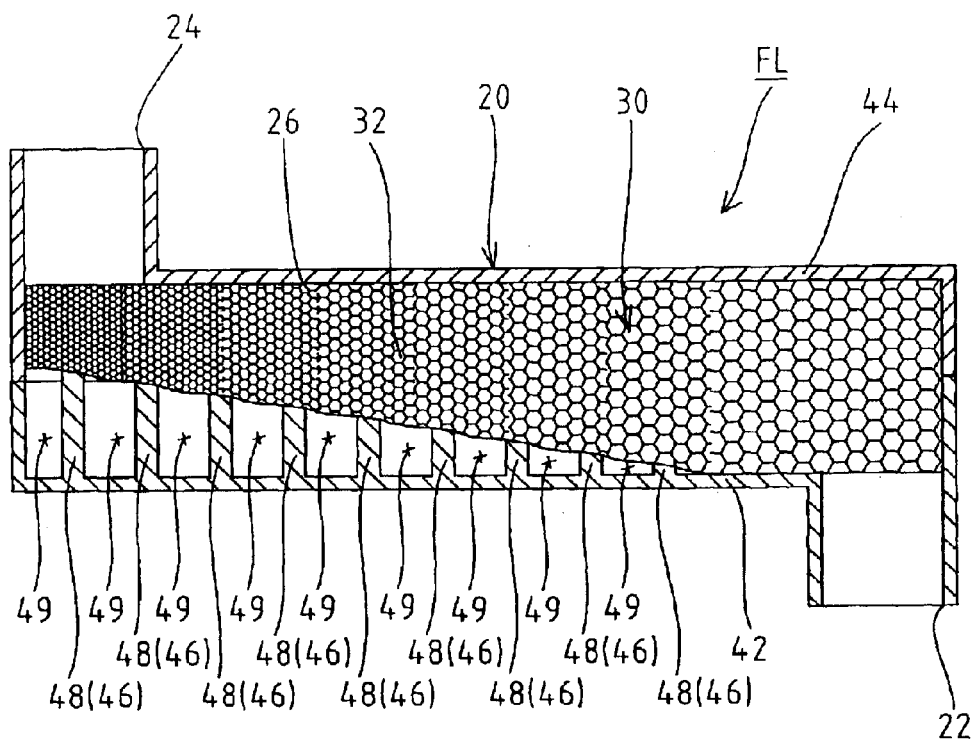
FIG. 1 is a vertical cross-sectional side view showing schematically'a fluid filter according to a first embodiment of the present invention.
Figure 2:
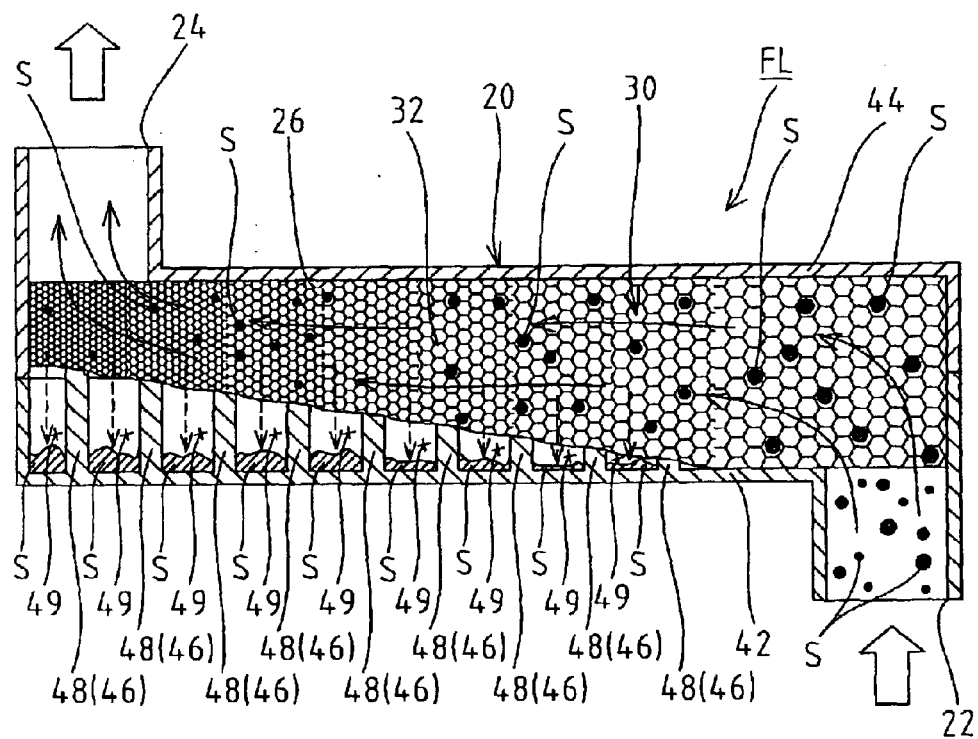
FIG. 2 is a vertical cross-sectional side view of the fluid filter shown in FIG. 1, which is in operation.
Figure 3:
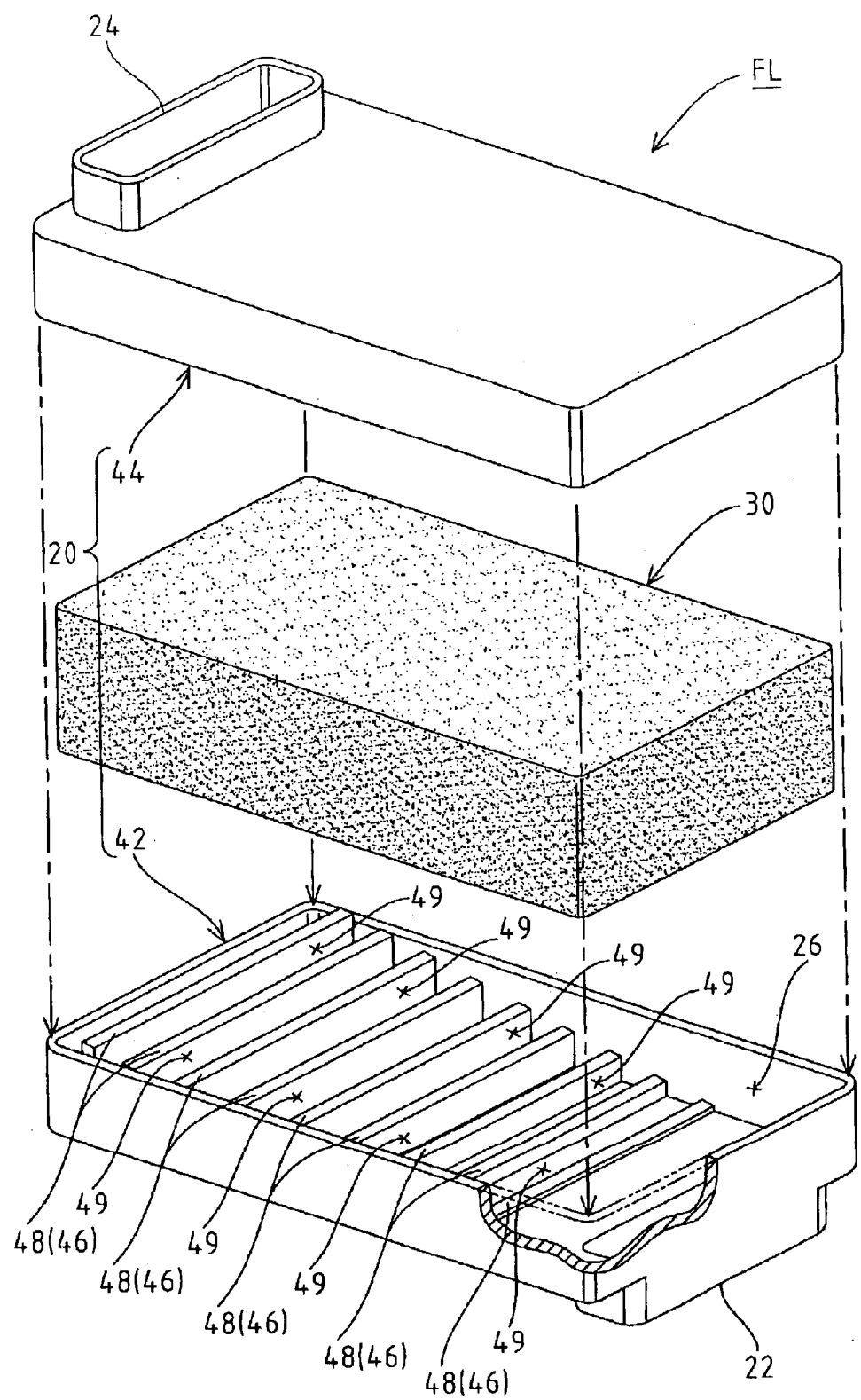
FIG. 3 is an exploded perspective view of the fluid filter shown in FIG. 1.

FIG. 1 is a vertical cross-sectional side view showing schematically a fluid filter according to a first embodiment of the present invention; FIG. 2 is a vertical cross-sectional side view of the fluid filter which is in operation; FIG. 3 is an exploded perspective view of the fluid filter. The fluid filter FL according to the first embodiment is provided with a filter case (case body) 20 and a single (one kind of) filter medium 30. The filter case 20 has an inlet 22 and an outlet 24 for a fluid formed at required positions respectively and also has a holder 26 defined therein to communicate with the inlet 22 and the outlet 24. The filter medium 30 is made of a porous material having an appropriate flexibility and a uniform density and is removably housed in the holder 26. While urethane foam having an open-cell structure is exemplified as the porous material in this embodiment, other employable porous materials include synthetic resin open-cell foams such as of rubbers and plastics (including porous materials to be manufactured by means of extraction), nonwoven fabrics, fiber assemblies such as of plastics, inorganic materials and metals), etc.

The filter case 20 is composed of a tray-like first half 42 and an antitray-like second half 44. The first half 42 and the second half 44 are opposed to each other and are combined to form a rectangular housing defining therein the holder 26 in which the filter medium 30 is to be housed. The inlet 22 for permitting inflow of a fluid into the holder 26 is oblong and is formed on one side of the first half 42, whereas the outlet 24 for permitting flowing of the fluid in the holder 26 out of the case is also oblong and is formed on one side of the second half 44. When the first half 42 and the second half 44 having the structures as described above respectively are combined, the inlet 22 and the outlet 24 open to the lower right position and to the upper left position of the filter case 20, respectively. The fluid introduced through the inlet 22 into the filter case 20 is allowed to flow from one end to the other end of the holder 26 and is then discharged from the filter case 20 through the outlet 24.

The first half 42 has on the internal wall surface thereof a necessary number of rib-like pressing portions 46 formed to protrude into the holder 26 so as to hold the filter medium 30 housed in the holder 26 in a compressed state. More specifically, the pressing portions 46 are formed parallelwise on one side within the holder 26, and they are designed to be pressed against the filter medium 30 housed in the holder 26 to compress it so as to enable formation of a compressed region 32 in the filter medium 30 as desired where the rate of capturing extraneous substances S is increased. Here, the pressing portions 46 are a plurality of ribs 48 (9 ribs in the first embodiment) formed in the filter case 20, which are arranged parallelwise from the inlet 22 side toward the outlet 24 side at suitable intervals. In other words, provided that the external profile of the filter medium 30 is a rectangular solid conforming substantially to the internal profile of the filter case 20, the ribs 48 are designed to have heights respectively such that they can hold the filter medium 30 housed in the holder 26 in a suitably compressed state and that the degree of compression of the compressed region 32 in the filter medium 30 changes depending on the height of the rib 48 (the higher the rib 48 is, the higher becomes the degree of compression deformation of the filter medium 30 and so with the density of the compressed region 32).

In the fluid filter FL of the first embodiment, the rib 48 located proximate to the inlet 22 and the pressing portion 46 located proximate to the outlet 24 are designed to be the lowest and the highest, respectively. The ribs 48 or pressing portions 46 are designed to have heights that increase gradually from the inlet 22 side toward the outlet 24 side. In such an arrangement of the ribs 48, the quantity of compression deformation of the compressed region 32 to be formed in the filter medium 30 housed in the holder 26 is designed to increase gradually from the inlet 22 side toward the outlet 24 side, so that the degree of compression of the compressed region 32 is adapted to increase gradually from the inlet 22 side toward the outlet 24 side.

Further, the plurality of ribs 48 (pressing portions 46) arranged parallelwise at necessary intervals in the first half 42 between the inlet 22 and the outlet 24 are adapted to define empty spaces 49 between the holder 26 and the filter medium 30 and adjacent to the respective ribs 48b. This constitution can cause extraneous substances S captured in the compressed region 32 of the filter medium 30 to partly drop into the empty spaces 49 and settle there, enabling extension of period until occurrence of clogging in the filter medium 30, as well as, the cycle of replacing or cleaning the filter medium 30.

The filter medium 30 is made of a porous material such as urethane foam having an open-cell structure, and is molded into a rectangular solid shape conforming to the rectangular holder 26 defined in the filter case 20 (see FIG. 3) by utilizing dies for expansion molding and the like or by cutting into that shape from a large blank of urethane foam obtained by expansion molding. The filter medium 30 thus obtained contains a multiplicity of open-cells (air gaps) formed during the expansion molding and is very resilient and flexible. It normally has a uniform density as a whole, and the open-cells (air gaps) are entirely of substantially the same size. When the filter medium 30 is compressed externally, the compressed region readily undergoes compression deformation to have an increased density compared with the uncompressed region, and the open-cells (air gaps) in the compressed region are squeezed to reduce in size, enabling capturing of smaller sizes of extraneous substances S there. It should be noted here that the density etc. of the filter medium 30 are to be decided depending on the fluid (gas or liquid) to be cleaned.

Figure 4:
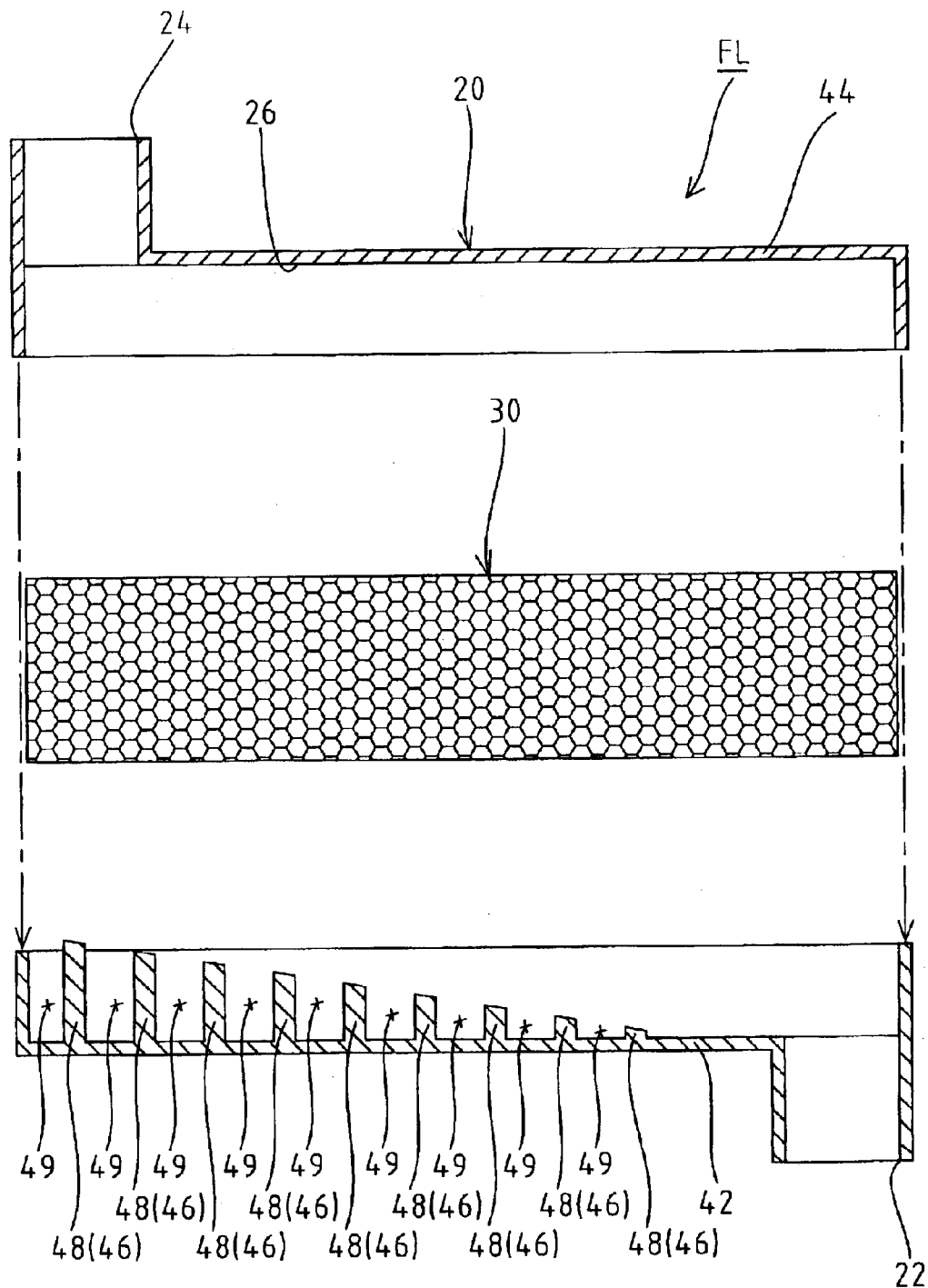
FIG. 4 is a cross-sectional view showing a state where a filter medium is being housed in a holder to be defined in a filter case by combining a first half with a second half.

In the fluid filter FL of the first embodiment composed essentially of the filter case 20 and the filter medium 30, the filter medium 30 is housed in the holder 26 defined in the filter case 20 by combining the first half 42 and the second half 44 with the filter medium 30 being interposed between them, as shown in FIGS. 3 and 4. Here, when the first half 42 and the second half 44 are combined, the ribs 48 formed on the first half 42 are pressed against an external surface of the filter medium 30 housed in the holder 26 in one direction to compress it, and thus the compressed region 32 is intentionally formed, where the rate of capturing extraneous substances S is increased. Besides, the ribs 48 are designed to have heights respectively as described above, so that the thickness of the compressed region 32 formed in the filter medium 30 reduces gradually from the inlet 22 side toward the outlet 24 side (see FIG. 1) to increase the degree of compression of the filter medium gradually from the inlet 22 side toward the outlet 24 side, enabling the filter medium 30 to capture extraneous substances S of various sizes such that the size of extraneous substances to be captured by the filter medium 30 reduces gradually toward the outlet 24 side.

More specifically, in the fluid filter FL of the first embodiment, the compressed region 32 having an increased rate of capturing extraneous substances S can be formed intentionally by pressing the ribs 48 formed in the filter case 20 against a single (one kind of) urethane foam filter medium 30 obtained by expansion molding to have a uniform density as a whole. Even the use of the single filter medium 30 can show the same or high level of capturing performance compared with the case where a plurality of filter mediums of different densities (different capturing rates) are used. Thus, the rate of capturing extraneous substances S can be improved favorably at a low cost.

Therefore, in the fluid filter FL of the first embodiment, even if extraneous substances S of various sizes are contained in a fluid introduced into the filter case 20 through the inlet 22, larger extraneous substances S can be captured in the region of the filter medium 30 closer to the inlet 22, and the size of extraneous substances S to be captured by the filter medium 30 reduces gradually toward the outlet 24 side, as shown in FIG. 2. More specifically, even if extraneous substances S contained in a fluid differ in size, they are captured in different regions of the filter medium 30 depending on the size, so that the extraneous substances S are captured by the filter medium 30 evenly in its entirety, improving the capturing rate favorably. In addition, since extraneous substances S are prevented from being captured massively by a certain part of the filter medium 30, the smooth flow of the fluid passing through the filter medium 30 is maintained to minimize pressure loss.

Meanwhile, in the fluid filter FL of the first embodiment, since the ribs 48 formed on the internal wall surface of the filter case 20 define empty spaces 49 between the holder 26 and the filter medium 30 and adjacent to the respective ribs 48, as shown in FIG. 2, extraneous substances S captured in the compressed region 32 of the filter medium 30 are adapted to settle partly into these empty spaces 49. Thus, the amount of extraneous substances dwelling in the compressed region 32 of the filter medium 30 can be reduced proportionally, so that the period (duration) until occurrence of clogging of the filter medium 30 is extended to extend also the cycle of replacing or cleaning the filter medium 30 can be extended, enabling reduction of troublesome operations of replacing or cleaning the filter medium 30 and also curtailment of running cost.

(Variation of First Embodiment)

Figure 5:
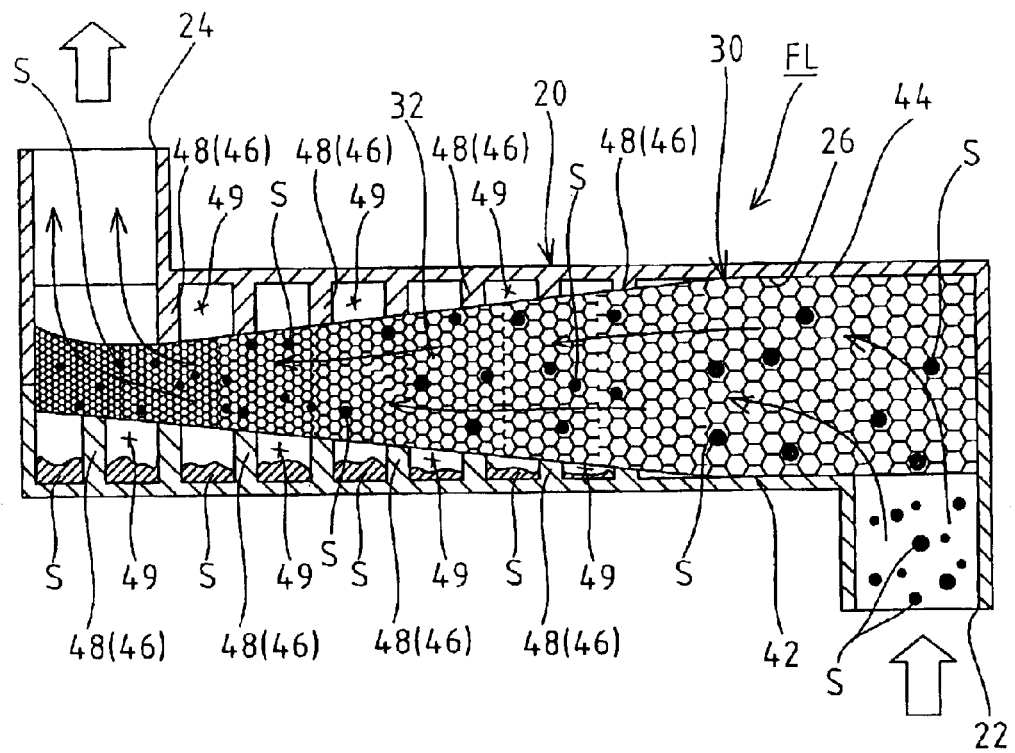
FIG. 5 is a vertical cross-sectional side view showing a fluid filter according to a variation of the first embodiment, which is in operation.

FIG. 5 is a vertical cross-sectional side view of the fluid filter FL according to a variation of the first embodiment, which is in operation. In the fluid filter FL illustrated in the first embodiment, a necessary number of pressing portions 46 (ribs 48) are formed on the internal wall surface of the filter case 20 such that they are arranged parallelwise on one side of the holder 26 (on the internal bottom surface of the first half 42 only) to compress the filter medium 30 from one side and obtain the compressed region 32. Meanwhile, in the fluid filter FL according to the variation, a necessary number of pressing portions 46 (ribs 48) are formed on the internal wall surface of the filter case 20 such that they are arranged parallelwise on both sides of the holder 26 (on the internal bottom surface of the first half 42 and on the internal top surface of the second half 44) to compress the filter medium 30 from both sides and obtain the compressed region 32.

Figure 6:
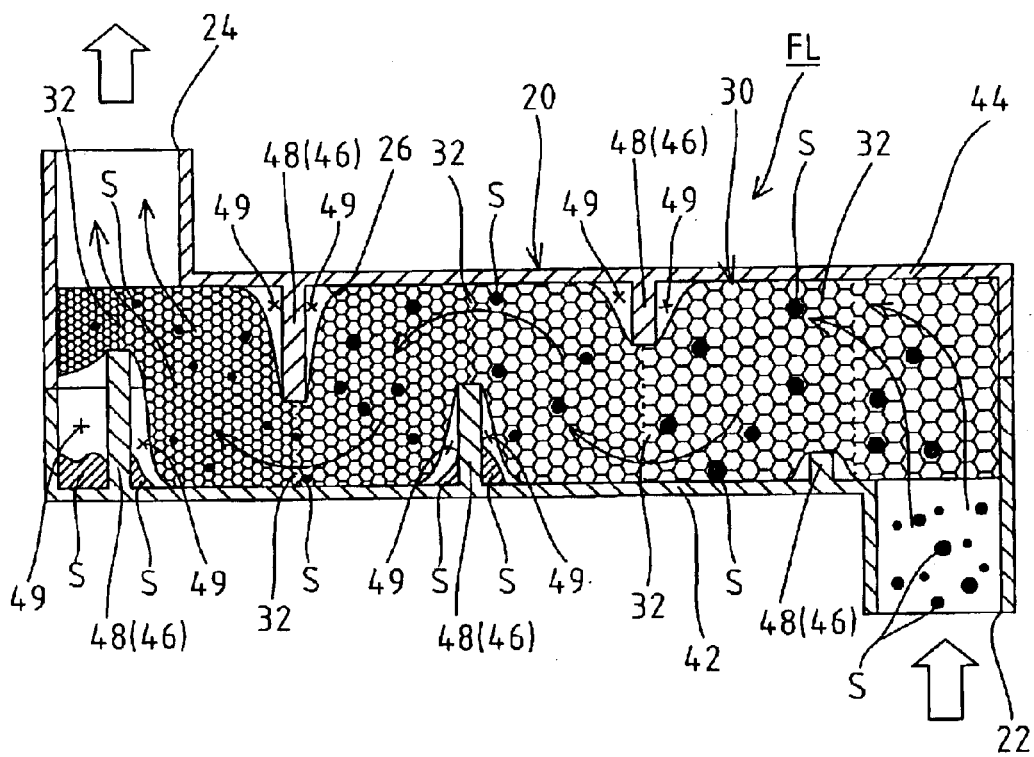
FIG. 6 is a vertical cross-sectional side view showing schematically a fluid filter according to another variation of the first embodiment.

FIG. 6 is a vertical cross-sectional side view showing a fluid filter FL according to another variation of the first embodiment, which is in operation. In the fluid filter FL according to this variation, the pressing portions 46 are arranged parallelwise on both sides of the holder 26 to compress a filter medium 30 from both sides to obtain a compressed region 32, in which the pressing portions 46 (ribs 48) formed on one side of the holder 26 (on the first half 42) and those formed on the other side of the holder 26 (on the second half 44) assume a staggered arrangement. If the ribs 48 are arranged as described above, the filter medium 30 is compressed alternately from both sides to form a compressed region 32, and the flow path for the fluid thus defined in the holder 26 assumes a so-called labyrinth structure. According to this structure, there can be expected further improvement in the rate of capturing extraneous substances S contained in a fluid.

It should be noted here that in the fluid filter FL according to the first embodiment and the fluid filters FL of the variations, the degree of compression (the quantity of compression deformation) of the compressed region 32 in the filter medium 30 can be adjusted in various manners, and also the flowage of the fluid introduced into the filter case 20 can be controlled by suitably changing the heights, positions, number, intervals, etc. of the pressing portions 46 (ribs 48).

Figure 7:
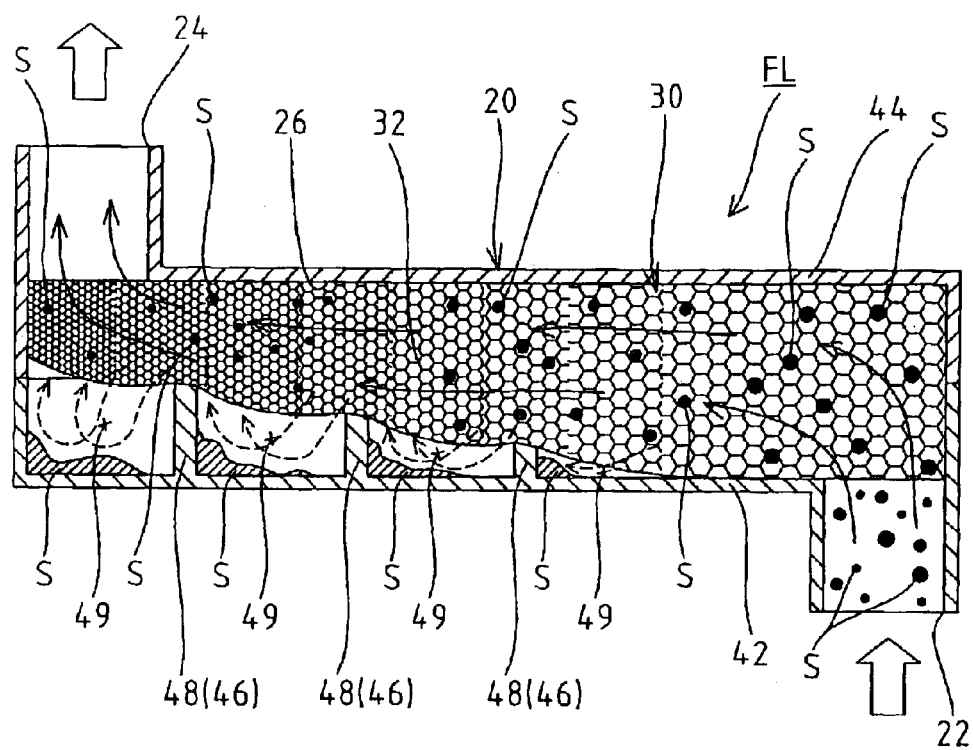
FIG. 7 is a vertical cross-sectional side view showing a fluid filter in operation, which is basically the same as the fluid filter shown in FIG. 1, except that the number of pressing portions is reduced.

For example, in a fluid filter FL shown in FIG. 7, the number of the pressing portions 46 (ribs 48) in the fluid filter FL of the first embodiment shown in FIGS. 1 to 4 is reduced (to three) to enlarge the empty spaces 49 to be defined between the holder 26 and the filter medium 30 and adjacent to the respective ribs 48. In the case where the empty spaces 49 are enlarged suitably as described above, the fluid flowing through the holder 26 is caused partly or entirely to impinge upon the ribs 48 and to flow into the empty spaces 49. Besides, the fluid flowed into each empty space 49 stagnates to dwell there for a while, so that the extraneous substances S if contained in the fluid dwelling in the empty space 49 are caused to settle partly or substantially onto the bottom of the empty space 49.

Figure 8:
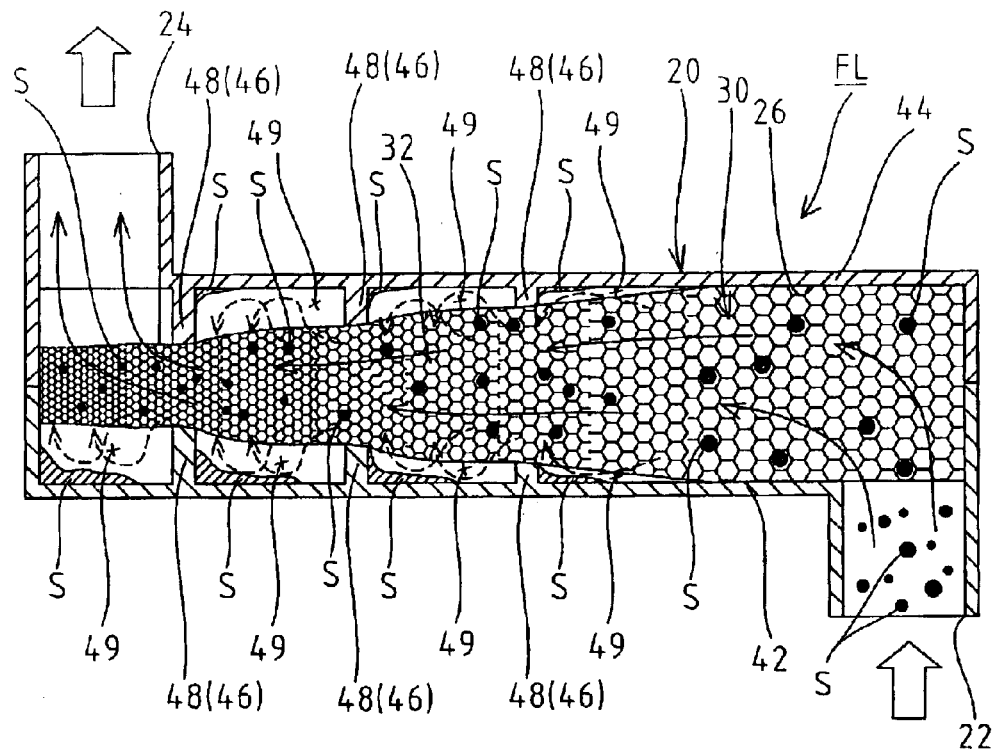
FIG. 8 is a vertical cross-sectional side view showing a fluid filter in operation, which is basically the same as the fluid filter shown in FIG. 5, except that the number of pressing portions is reduced.

In a fluid filter FL shown in FIG. 8, the number of the pressing portions 46 (ribs 48) in the fluid filter FL according to the variation of the first embodiment shown in FIG. 5 is reduced (to three) to enlarge the empty spaces 49 to be defined between the holder 26 and the filter medium 30 and adjacent to the respective ribs 48. In such a fluid filter FL again, the fluid is caused entirely or partly to flow into the empty spaces 49, so that the extraneous substances S if contained in the fluid dwelling in the empty spaces 49 are caused to settle partly or substantially onto the bottom of the empty spaces 49.

Figure 9:
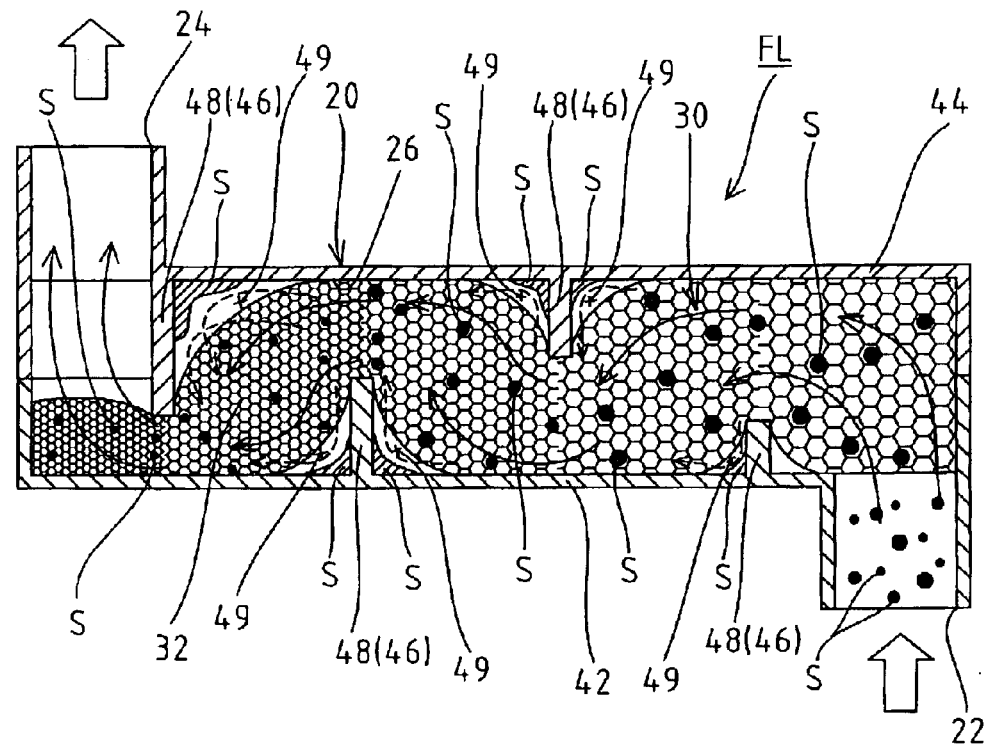
FIG. 9 is a vertical cross-sectional side view showing a fluid filter in operation, which is basically the same as the fluid filter shown in FIG. 6, except that the number of pressing portions is reduced.

In a fluid filter FL shown in FIG. 9, the number of the pressing portions 46 (ribs 48) in the fluid filter FL according to the other variation of the first embodiment shown in FIG. 6 is reduced to enlarge the empty spaces 49 to be defined between the holder 26 and the filter medium 30 and adjacent to the respective ribs 48. In such a fluid filter FL again, the fluid is caused partly or entirely to flow into the empty spaces 49, so that the extraneous substances S if contained in the fluid dwelling in the empty spaces 49 are caused to settle partly or substantially onto the bottom of the empty spaces 49.

(Second Embodiment)

Figure 10:
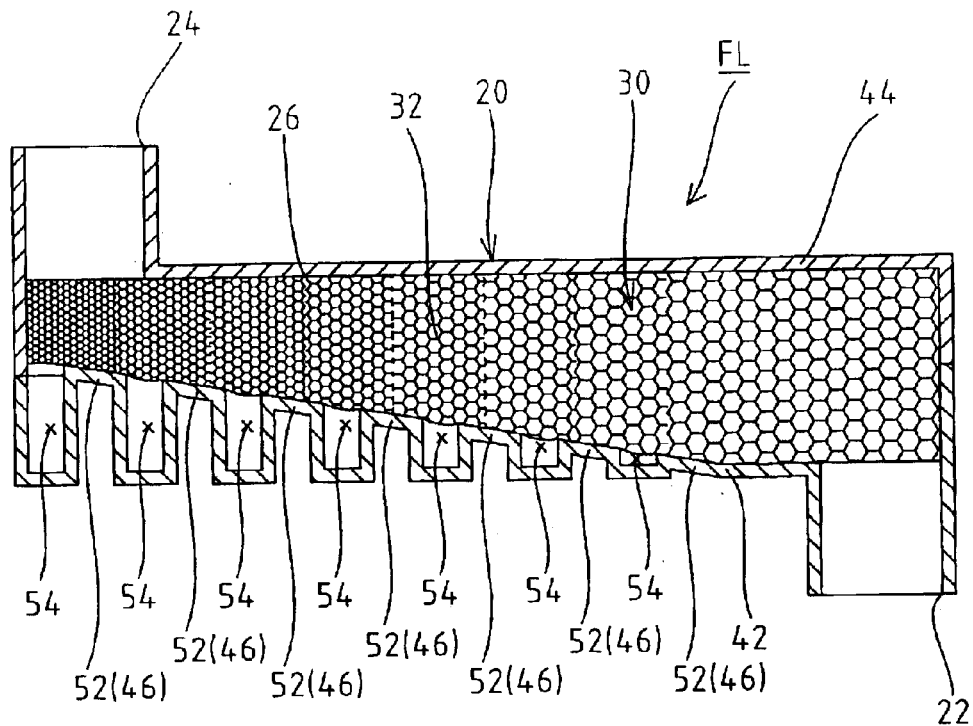
FIG. 10 is a vertical cross-sectional side view showing schematically a fluid filter according to a second embodiment of the present invention.
Figure 11:
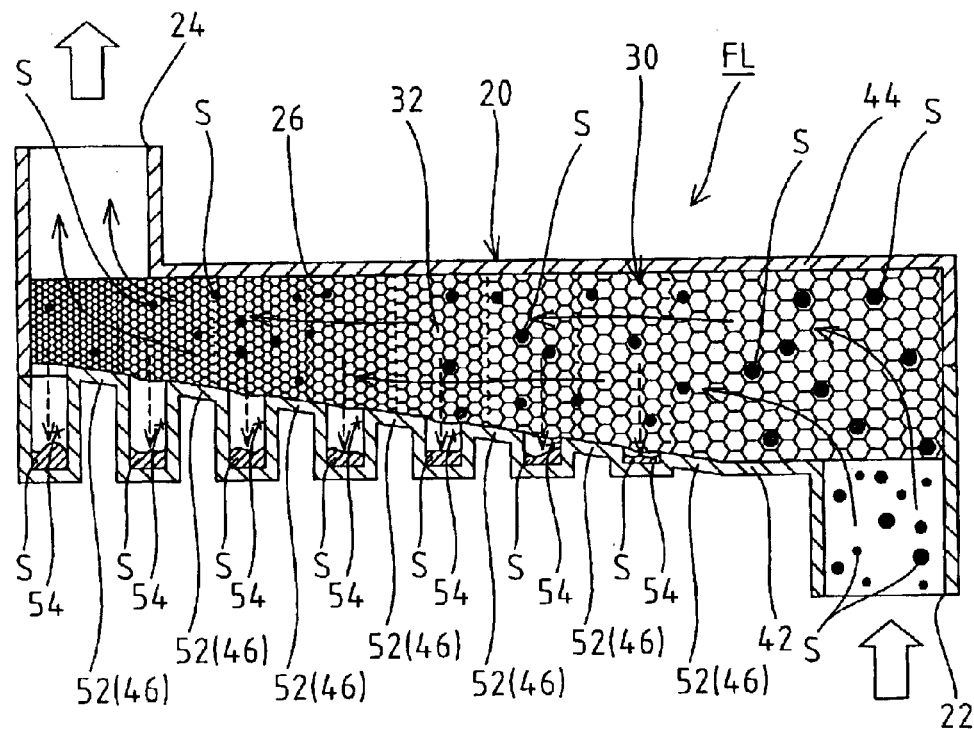
FIG. 11 is a vertical cross-sectional side view of the fluid filter shown in FIG. 10, which is in operation.
Figure 12:
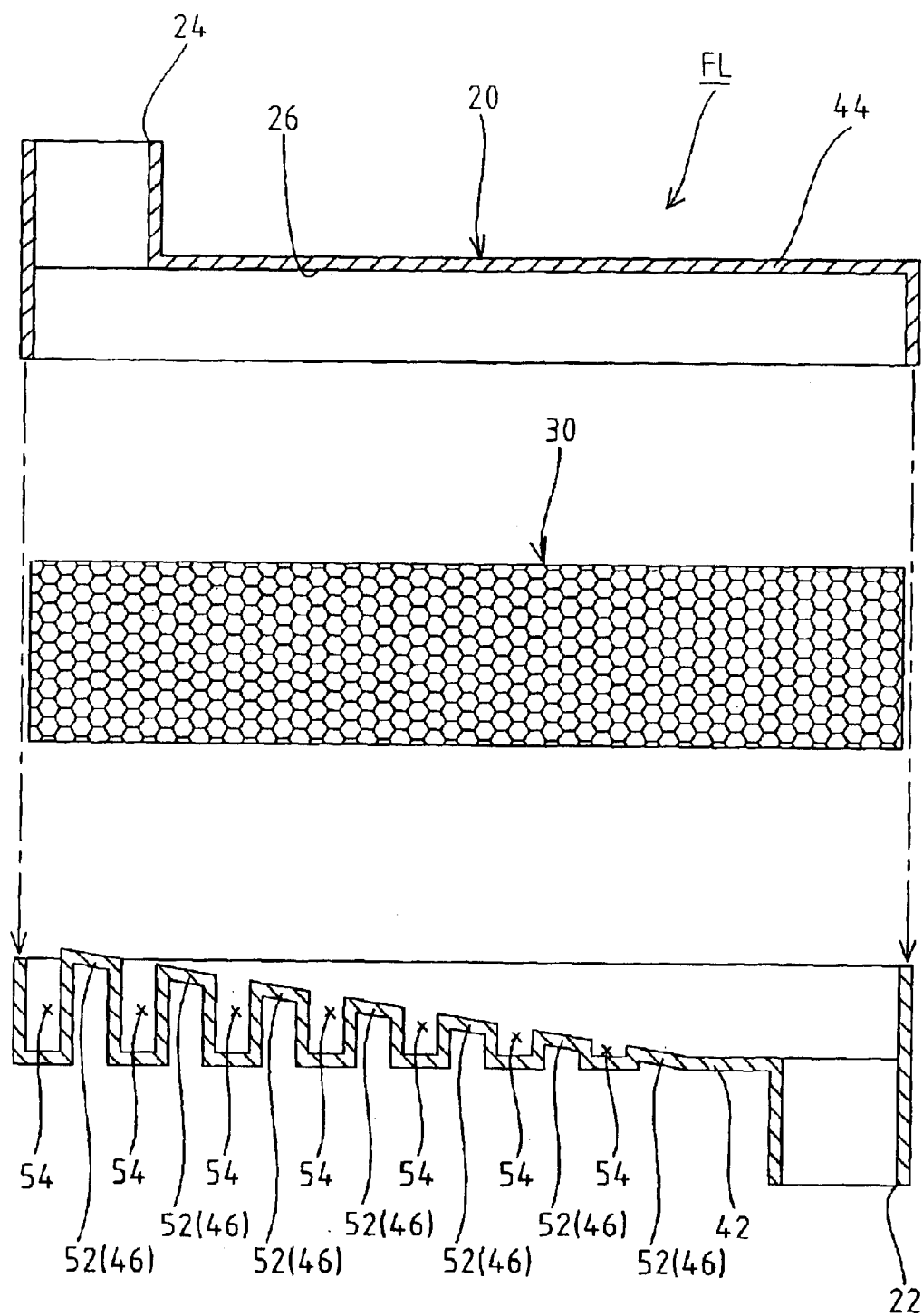
FIG. 12 is a cross-sectional view showing a state where a filter medium is being housed in a holder to be defined in a filter case by combining a first half with a second half.

FIG. 10 is a vertical cross-sectional side view showing schematically a fluid filter according to a second embodiment of the present invention; FIG. 11 is a vertical cross-sectional side view showing the fluid filter, which is in operation; FIG. 12 is an exploded cross-sectional view of the fluid filter. The fluid filter FL according to the second embodiment is substantially of the same constitution as the fluid filter FL of the first embodiment shown in FIG. 1, except that the configuration of the pressing portions 46 formed in the first half 42 of the filter case 20 is modified. Further, the same filter medium 30 as used in the first embodiment is also employable here.

In the fluid filter FL of the second embodiment, the bottom of the first half 42 in the filter case 20 is allowed to have a serrated cross-section so as to hold the filter medium 30 housed in the holder 26 in a compressed state so that ridges 52 thus formed as parts of the bottom of the first half 42 are allowed to serve as pressing portions 46 for pressing the filter medium 30. More specifically, a compressed region 32 having an increased rate of capturing extraneous substances S is designed to be obtained as desired by pressing the ridges 52 against the filter medium 30 housed in the holder 26 to compress it from one side. Here, the ridges 52 are arranged parallelwise at suitable intervals from the inlet 22 side toward the outlet 24 side (7 ridges are formed in the second embodiment). Provided that the filter medium 30 is of a rectangular solid having an external profile conforming substantially to the internal profile of the filter case 20, each ridge 52 is designed to have a height so that it can hold the filter medium 30 housed in the holder 26 in a suitably compressed state. The degree of compression of the compressed region 32 in the filter medium 30 changes depending on the height of the ridge 52. In other words, the higher the ridge 52 is, the higher becomes the quantity of compression deformation of the filter medium 30 and so with the density of the compressed region 32.

In the fluid filter FL of the second embodiment, the ridge 52 located proximate to the inlet 22 is designed to be the lowest, whereas the ridge 52 located proximate to the outlet 24 is designed to be the highest, and the ridges 52 are designed to have heights that increase gradually from the inlet 22 side toward the outlet 24 side. Thus, the quantity of compression deformation of the compressed region 32 to be formed in the filter medium 30 housed in the holder 26 increases gradually from the portion located proximate to the inlet 22 toward the portion located proximate to the outlet 24, and the density of the compressed region 32 is designed to increase gradually from the inlet 22 side toward the outlet 24 side.

Meanwhile, the plurality of ridges 52 (pressing portions 46) arranged parallelwise in the first half 42 at necessary intervals between the inlet 22 and the outlet 24 are adapted to define empty spaces 54 between the holder 26 and the filter medium 30 and adjacent to the respective ridges. This constitution can cause extraneous substances S captured in the compressed region 32 of the filter medium 30 to partly drop into the empty spaces 54 and settle there, enabling extension of the period until occurrence of clogging in the filter medium 30, as well as, the cycle of replacing or cleaning the filter medium 30.

In the fluid filter FL of the second embodiment composed essentially of the filter case 20 and the filter medium 30, the first half 42 and the second half 44 are combined with a filter medium 30 being interposed between them, as shown in FIG. 12, and thus the filter medium 30 can be housed in the holder 26 defined in the filter case 20 composed of the first half 42 and the second half 44. It should be noted here that, when the first half 42 and the second half 44 are combined, the ridges 52 formed on the first half 42 are pressed from one side against an external surface of the filter medium 30 housed in the holder 26 to compress it, and thus a compressed region 32 is intentionally formed, where the rate of capturing extraneous substances S is increased. Besides, the ridges 52 are designed to have heights respectively as described above, so that the thickness of the compressed region 32 formed in the filter medium 30 reduces gradually from the inlet 22 side toward the outlet 24 side (see FIG. 10) to increase the degree of compression of the filter medium 30 gradually from the inlet 22 side toward the outlet 24 side, enabling the filter medium 30 to capture extraneous substances S of various sizes such that the size of extraneous substances to be captured by the filter medium 30 reduces gradually toward the outlet 24 side.

More specifically, in the fluid filter FL of the second embodiment, the compressed region 32 having an increased rate of capturing extraneous substances S can be formed intentionally by pressing the ridges 52 formed in the filter case 20 against a single (one kind of) urethane foam filter medium 30 obtained by expansion molding to have a uniform density as a whole. Even the use of the single filter medium 30 can show the same or high level of capturing performance compared with the case where a plurality of filter mediums of different densities (different capturing rates) are used. Thus, the rate of capturing extraneous substances S can be improved favorably at a low cost.

Therefore, in the fluid filter FL of the second embodiment, even if extraneous substances S of various sizes are contained in a fluid introduced into the filter case 20 through the inlet 22, larger extraneous substances S can be captured in the region closer to the inlet 22, and the size of extraneous substances S to be captured reduces toward the outlet 24 side, as shown in FIG. 11. More specifically, even if extraneous substances S contained in a fluid differ in size, they are captured in different regions of the filter medium 30 depending on the size, so that extraneous substances S are captured by the filter medium 30 evenly in its entirety, improving the capturing rate favorably. In addition, since extraneous substances S are prevented from being captured massively by a certain part of the filter medium 30, the smooth flow of the fluid passing through the filter medium 30 is maintained to minimize pressure loss.

Meanwhile, in the fluid filter FL of the second embodiment, the ridges 52 formed on the internal wall surface of the filter case 20 define empty spaces 54 between the holder 26 and the filter medium 30 and adjacent to the respective ribs 48, as shown in FIG. 11, so that extraneous substances S captured in the compressed region 32 of the filter medium 30 are adapted to settle partly into these empty spaces 54. Thus, the amount of extraneous substances dwelling in the compressed region 32 of the filter medium 30 can be reduced proportionally, so that the period (duration) until occurrence of clogging of the filter medium 30 is extended to extend also the cycle of replacing or cleaning the filter medium 30, enabling reduction of troublesome operations of replacing or cleaning the filter medium 30 and also curtailment of running cost.

(Variation of Second Embodiment)

In the fluid filter FL shown in the second embodiment, a necessary number of pressing portions 46 (ridges 52) are formed on the internal wall surface of the filter case 20 such that they are arranged parallelwise on one side of the holder 26 (on the internal bottom surface of the first half 42 only) to compress the filter medium 30 from one side and obtain the compressed region 32. However, in order to form a compressed region 32 having an increased rate of capturing extraneous substances S in a filter medium 30 as desired by pressing the pressing portions 46 formed in the filter case 20 against the filter medium housed in the holder 26, there can also be employed an embodiment (not shown), in which the pressing portions 46 (ridges 52) are formed on the internal surface of the filter case 20 such that they are arranged on both sides of the holder 26 (on the internal bottom surface of the first half 42 and on the internal top surface of the second half 44) to compress the filter medium 30 with the pressing portions 46 from both sides and obtain the compressed region 32.

Further, in the case where the pressing portions 46 are arranged parallelwise on both sides in the holder 26 to compress a filter medium 30 from both sides to obtain a compressed region 32 like in the other variation of the first embodiment shown in FIG. 6, the pressing portions 46 (ridges 52) formed on one side of the holder 26 (on the first half 42) and those formed on the other side of the holder 26 (on the second half 44) can assume a staggered arrangement (not shown). If the ridges 52 are arranged as described above, the filter medium 30 is compressed alternately from both sides to form a compressed region 32, and the resulting flow path for the fluid defined by the holder 26 assumes a so-called labyrinth structure. According to this structure, there can be expected further improvement in the rate of capturing extraneous substances S contained in a fluid.

It should be noted here that in the fluid filter FL according to the second embodiment and the fluid filters FL of the variations, the degree of compression (the quantity of compression deformation) of the compressed region 32 in the filter medium 30 can be adjusted in various manners, and also the flowage of the fluid introduced into the filter case 20 can be controlled by suitably changing the heights, positions, number, intervals, etc. of the pressing portions 46 (ribs 52).

Figure 13:
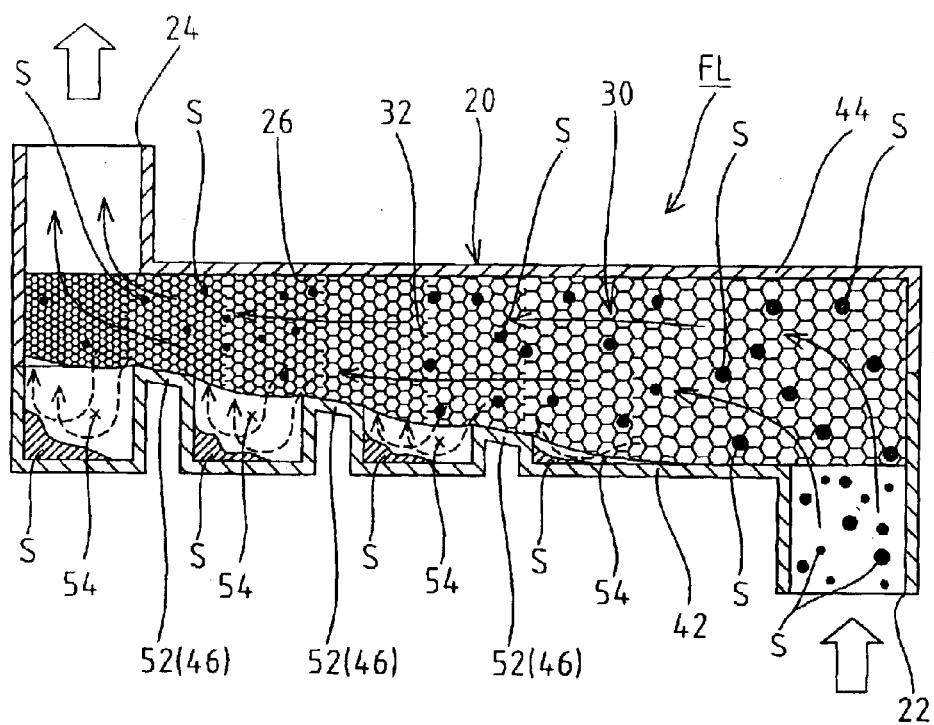
FIG. 13 is a vertical cross-sectional side view showing a fluid filter in operation, which is basically the same as the fluid filter shown in FIG. 10, except that the number of pressing portions is reduced.

FIG. 13 exemplifies a fluid filter FL, in which the number of the pressing portions 46 (ridges 52) in the fluid filter FL of the second embodiment shown in FIGS. 10 to 12 is reduced (to three) to enlarge the empty spaces 54 to be defined between the holder 26 and the filter medium 30 and adjacent to the respective ridges 52. In the case where the empty spaces 54 are enlarged suitably as described above, the fluid flowing through the holder 26 is entirely or partly caused to impinge upon the ridges 52 and to flow into the empty spaces 54. Besides, the fluid flowed into each empty space 54 stagnates to dwell there for a while, so that the extraneous substances S if contained in the fluid dwelling in the empty space 54 settle partly or substantially onto the bottom of the empty space 54.

Although not illustrated typically, even in the embodiment where pressing portions 46 are arranged parallelwise on both sides in the holder 26 to compress the filter medium 30 from both sides, if the number of the ridges 52 is reduced to enlarge the empty spaces 54 so as to allow the fluid to flow entirely or partly into the empty spaces 54, the extraneous substances S contained in the fluid dwelling in the empty space 54 are caused to settle partly or substantially onto the bottom of the empty space 54.

(Third Embodiment)

Figure 14:
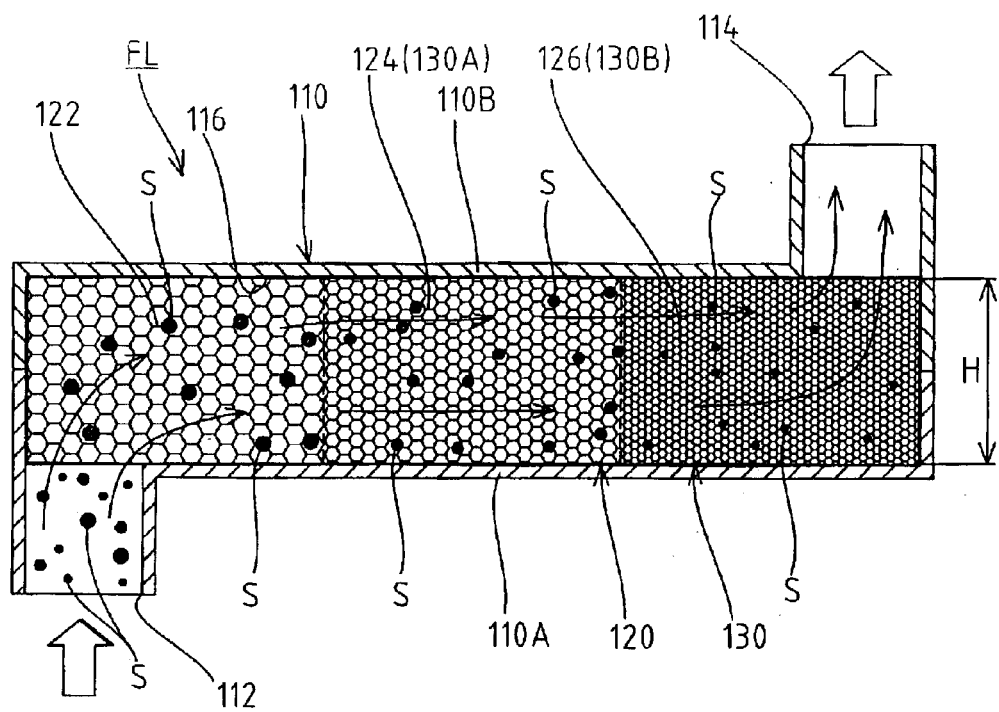
FIG. 14 is a vertical cross-sectional side view showing schematically a fluid filter according to a third embodiment of the present invention.
Figure 15:
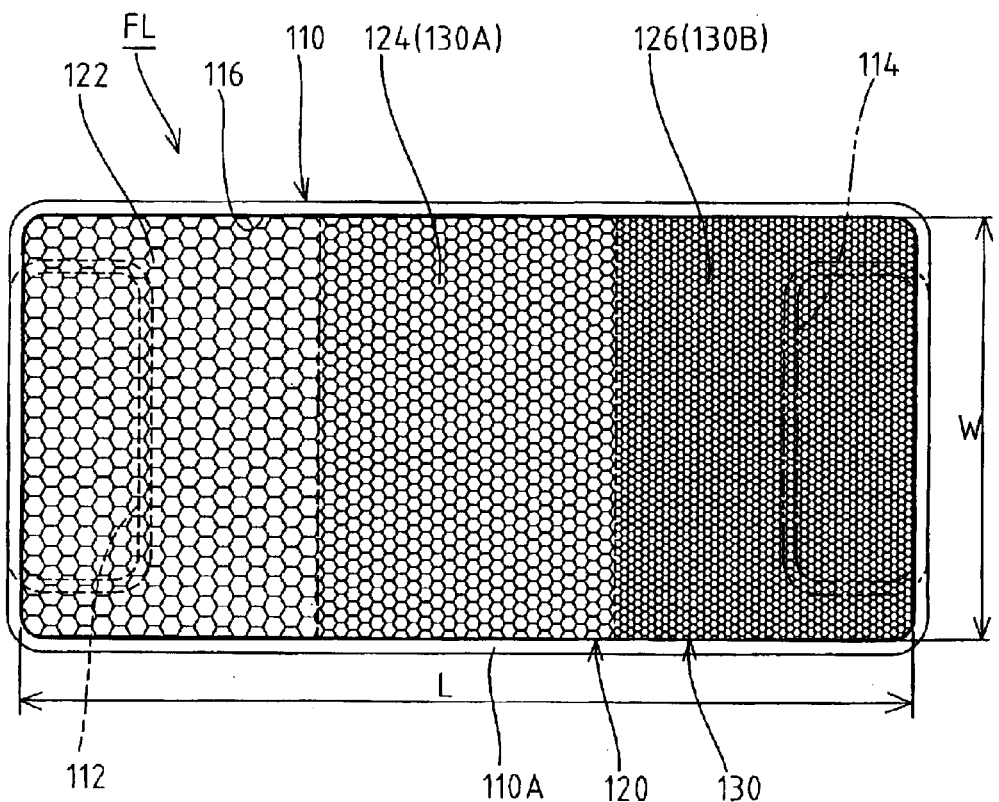
FIG. 15 is a horizontal cross-sectional plan view showing schematically the fluid filter according to the third embodiment.
Figure 16:
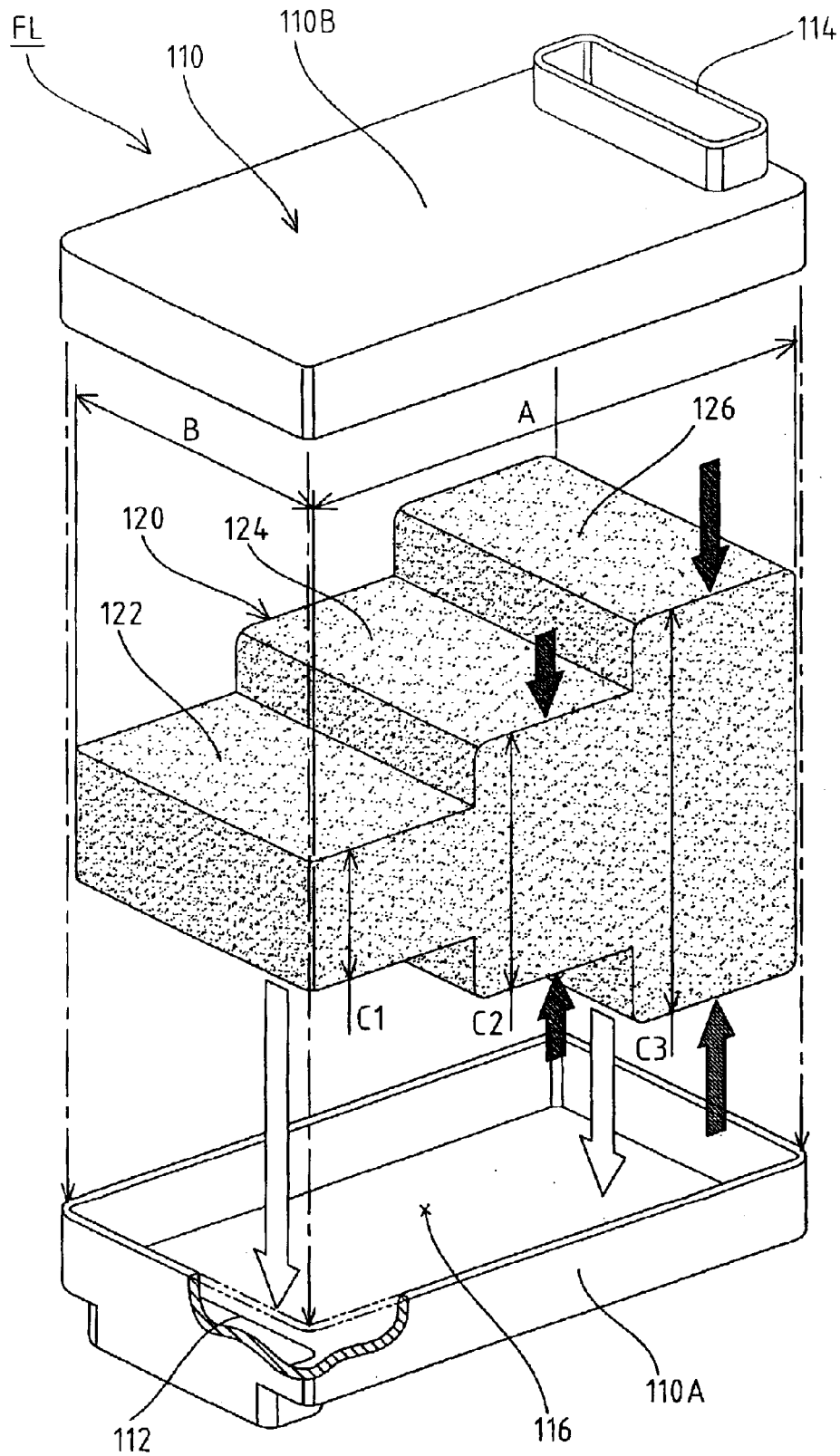
FIG. 16 is an exploded perspective view of the fluid filter according to the third embodiment.

FIG. 14 is a vertical cross-sectional side view showing schematically a fluid filter according to a third embodiment of the present invention; FIG. 15 is a horizontal cross-sectional plan view showing schematically the fluid filter shown in FIG. 14; FIG. 16 is an exploded perspective view of the fluid filter. The fluid filter FL according to the third embodiment is provided with a filter case (case body) 110 and a filter medium 120. The filter case 110 has an inlet 112 and an outlet 114 for a fluid at required positions respectively and also has a holder 116 defined therein to communicate with the inlet 112 and the outlet 114. The filter medium 120 is made of a porous material having an appropriate flexibility and a uniform density and is removably housed in the holder 116. While urethane foam having an open-cell structure is exemplified as the porous material in this embodiment, other porous materials employable here as the filter medium 120 include synthetic resin open-cell foams such as of rubbers and plastics (including porous materials to be manufactured by means of extraction), nonwoven fabrics, fiber assemblies (such as of plastics, inorganic materials and metals), etc.

Figure 24:
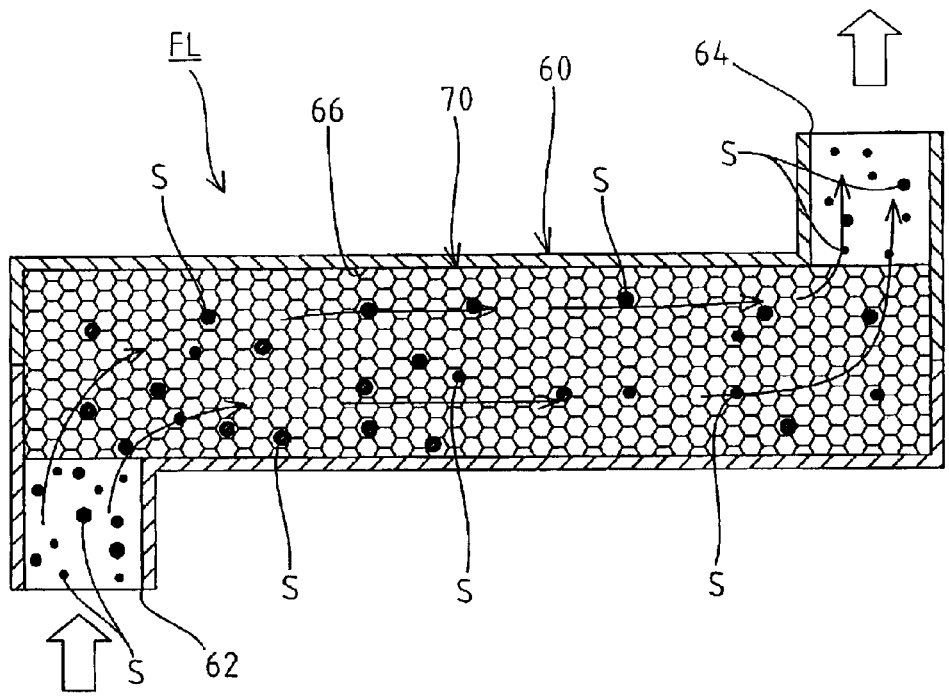
FIG. 24 is a vertical cross-sectional side view of a conventional fluid filter having a single coarse filter medium housed in a filter case thereof.
Figure 25:
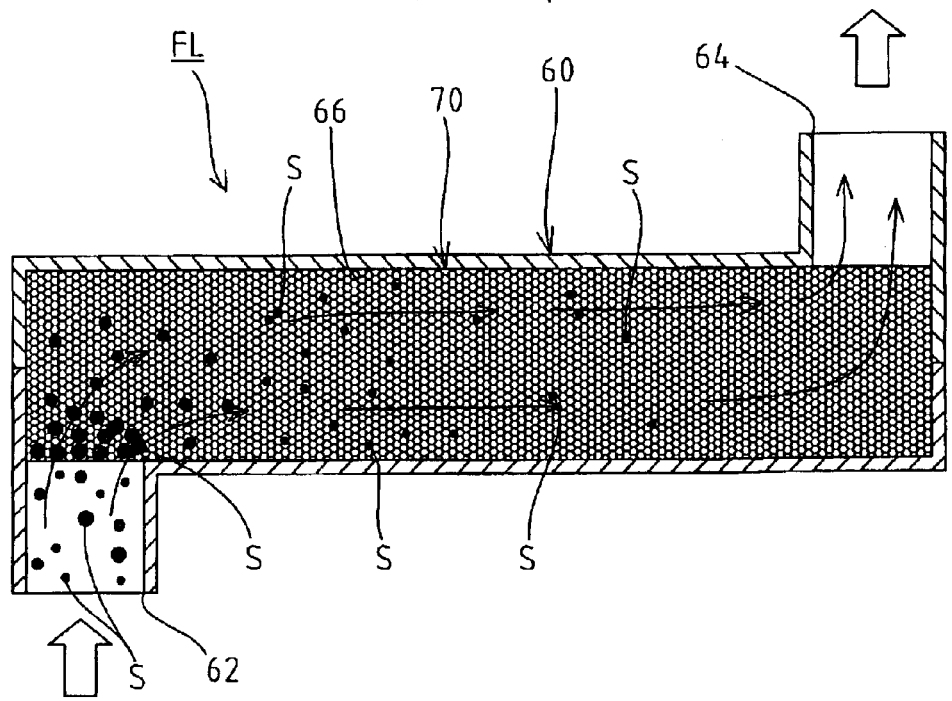
FIG. 25 is a vertical cross-sectional side view of another conventional fluid filter having a single fine filter medium housed in a filter case thereof.
Figure 26:
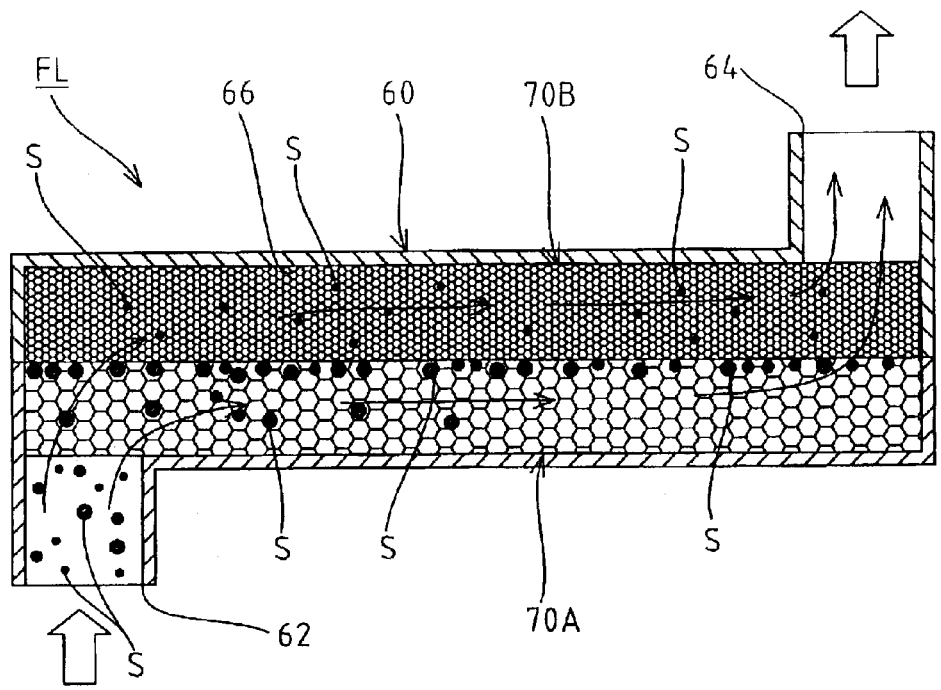
FIG. 26 is a vertical cross-sectional side view of an improved fluid filter having a coarse first filter medium and a fine second filter medium housed in a filter case thereof.
Figure 27:
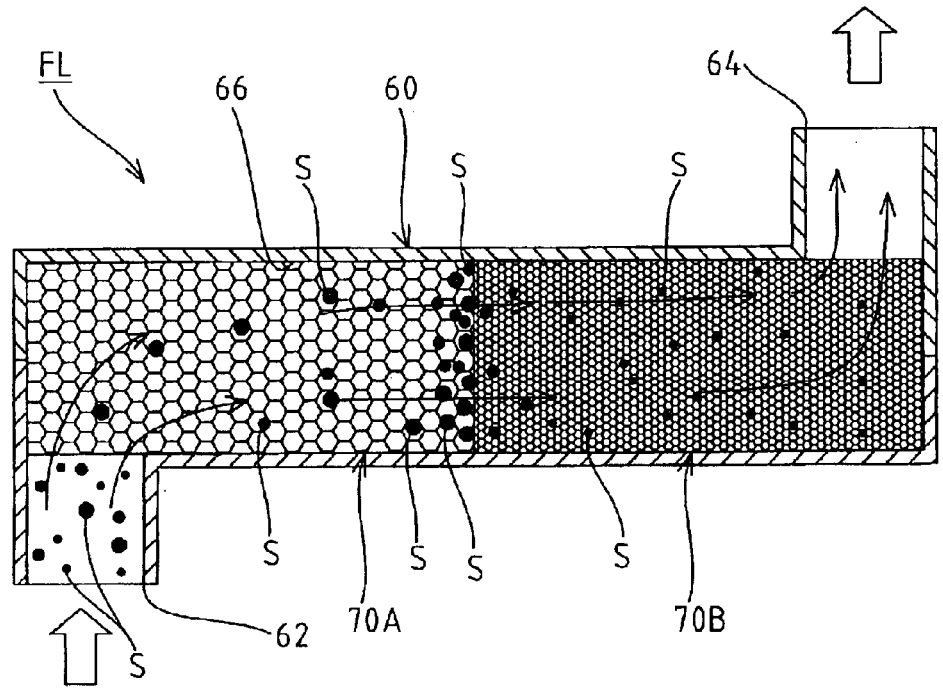
FIG. 27 is a vertical cross-sectional side view of another improved fluid filter having a coarse first filter medium and a fine second filter medium housed in a filter case thereof.
Figure 28:
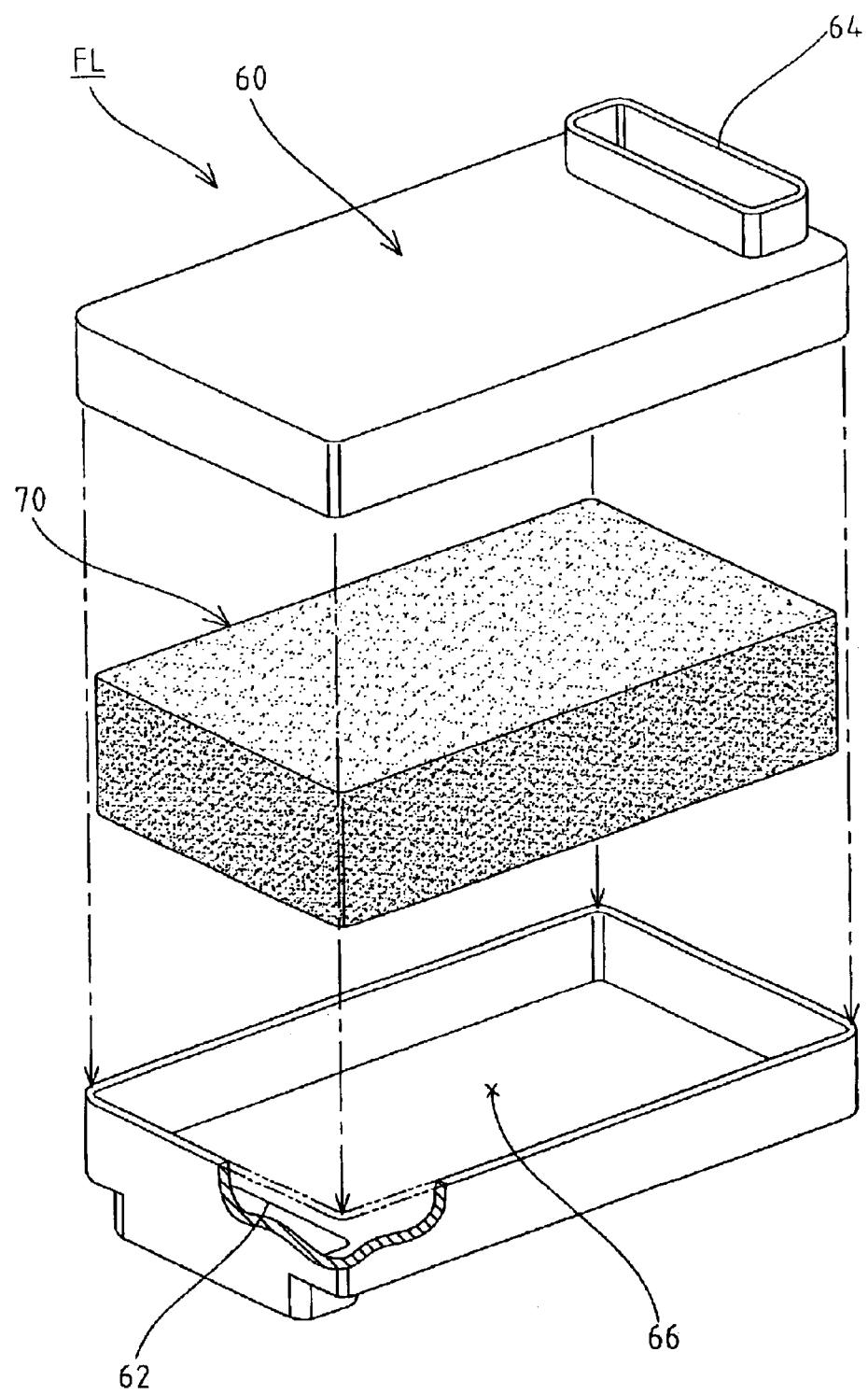
FIG. 28 is an exploded perspective view of the fluid filter shown in FIG. 24 or FIG. 25, illustrating that the filter medium is designed to have outside dimensions such that the volume thereof is equal to the internal volume of the holder defined in the filter case.
Figure 29:
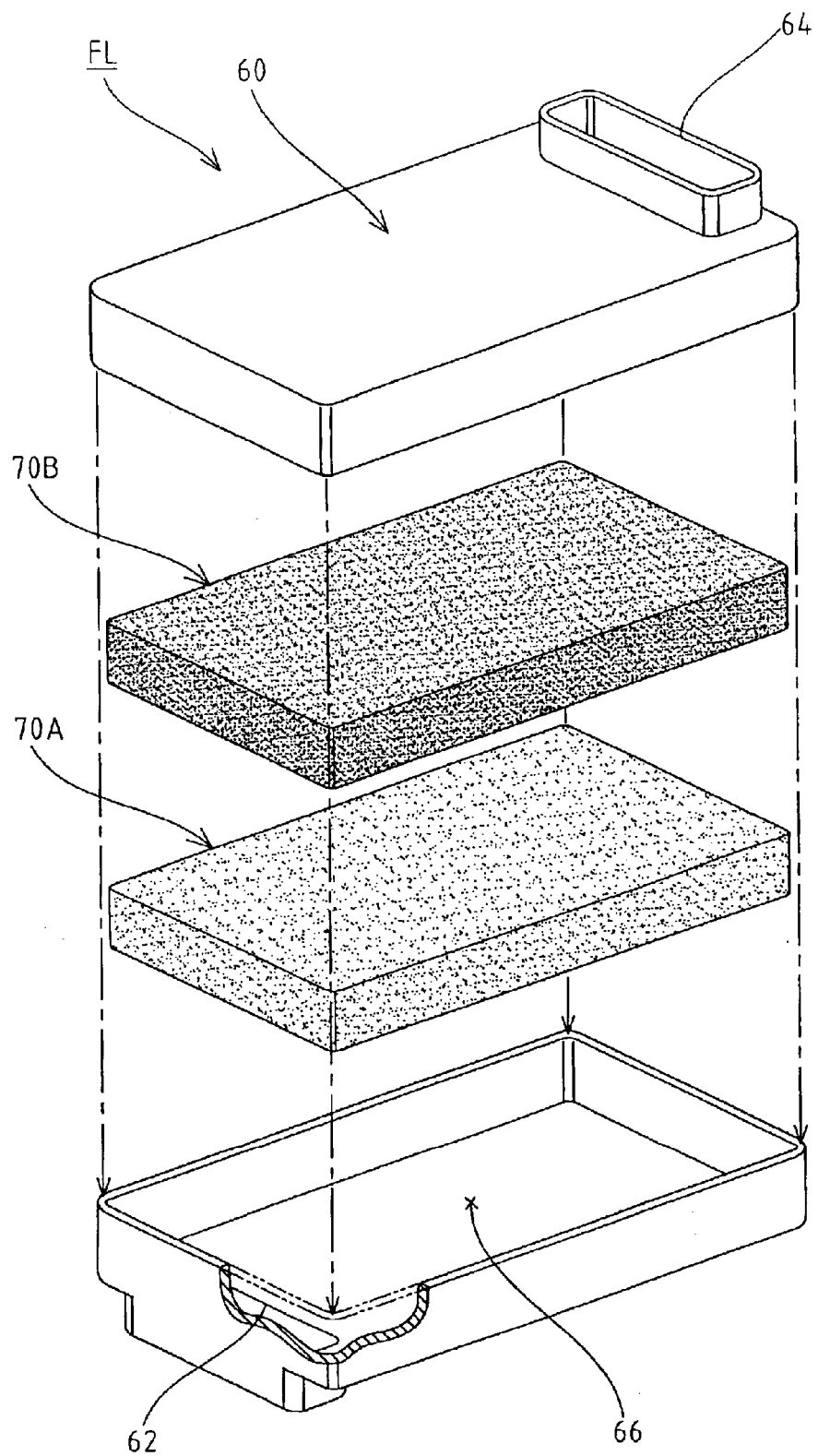
FIG. 29 is an exploded perspective view of the fluid filter shown in FIG. 26, illustrating that the combined first filter medium and the second filter medium as a whole are designed to have outside dimensions such that the volume of the filter medium is equal to the internal volume of the holder defined in the filter case.
Figure 30:
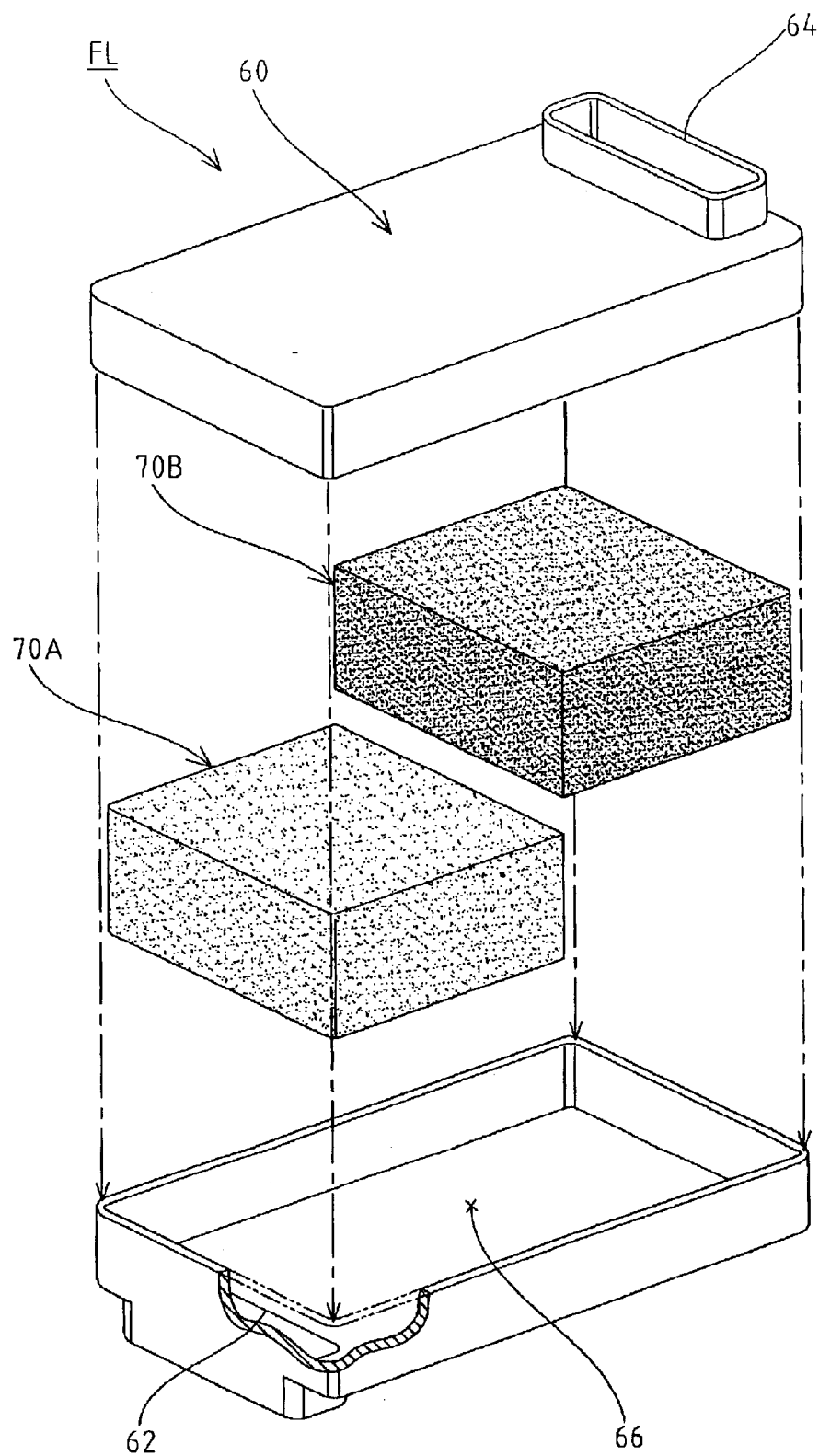
FIG. 30 is an exploded perspective view of the fluid filter shown in FIG. 27, illustrating that the combined first filter medium and the second filter medium as a whole are designed to have outside dimensions such that the volume of the filter medium is equal to the internal volume of the holder defined in the filter case.

The filter case 110 is substantially the same as that shown in FIG. 24 or the like and is composed of a tray-like first half 110A and an antitray-like second half 110B. The opening of the first half 110A and that of the second half 110B are opposed to each other and are combined to form a rectangular housing defining therein a rectangular holder 116 (length L×width W×height H) for holding the filter medium 120. The inlet 112 for permitting inflow of a fluid into the holder 116 is oblong and is defined on one side of the first half 110A, whereas the outlet 114 for permitting flowing of the fluid in the holder 116 out of the case is also oblong and is defined on one side of the second half 110B. When the first half 110A and the second half 110B having the constitutions as described above respectively are combined, the inlet 112 and the outlet 114 open to the lower left position and to the upper right position of the filter case 110, respectively. The fluid introduced through the inlet 112 into the filter case 110 is allowed to flow from one end to the other end of the holder 116 and is discharged from the filter case 110 through the outlet 114.

The filter medium 120 is made of urethane foam, a porous material having an open-cell structure, and has outside dimensions (at least before it is housed in the holder 116) such that the volume of the filter medium 120 is suitably greater than the internal volume of the holder 116. The filter medium 120 is formed into a necessary shape by utilizing dies for expansion molding and the like or by cutting into the shape from a large blank of urethane foam obtained by expansion molding. The filter medium 120 thus obtained contains a multiplicity of open-cells (air gaps) formed during expansion molding and is very resilient and flexible. It normally has a uniform density as a whole, and the open-cells are entirely of substantially the same size. When the filter medium 120 is pressed externally, the pressed region readily undergoes compression deformation to have an increased density compared with the uncompressed region, and the open-cells (air gaps) in the thus compressed region are squeezed to reduce in size. Thus, if the filter medium 120 is housed in the holder 116 in a compressed state as will be describe later, a compressed region 130 having an increased rate of capturing extraneous substances S contained in the fluid can be formed at a desired position of the filter medium 120 (see FIGS. 14 and 15), enabling capturing of various sizes of extraneous substances S by the filter medium 120 in its entirety.

When a filter medium 120 larger than the holder 116 is to be formed, the difference in dimension between the filter medium 120 and the holder 116 in the vertical direction of the filter case 110 is designed to be greater on the outlet 114 side than on the inlet 112 side so that the degree of compression of the compressed region 130 to be formed in the filter medium 120 is higher on the outlet 114 side than on the inlet 112 side. In other words, in the filter medium 120 made of a porous material of a uniform density, air gaps contained therein are squeezed more and more as the degree of compression increases, enabling capturing of smaller size of extraneous substances S. Thus, the filter medium 120 is designed to have a lower degree of compression (or is not compressed) on the inlet 112 side to enable capturing of extraneous substances S of larger sizes, and the degree of compression is increased stepwise or continuously toward the outlet 114 side to enable capturing of extraneous substances S of smaller sizes, depending on the degree of compression.

The filter medium 120 contained in the fluid filter FL of the third embodiment formed under the prerequisite as described above is divided into three sections (a first section 122, a second section 124 and a third section 126) which are located serially along the longitudinal direction of the filter case 110, as shown in FIGS. 16 and 17. In this state, the length A and the width B of the filter medium 120 are designed to be basically the same as the length L and the width W of the holder 116, and only the thickness C of the former is designed to be suitably greater than the height H of the latter. More specifically, the first section 122 located proximate to the inlet 112, the second section 124 located between the inlet 112 and the outlet 114 and the third section 126 located proximate to the outlet 114 are designed to have a thickness substantially the same as the height H of the holder 116, a thickness of nearly twice as much as the height H of the holder 116 and a thickness of about three times as much as the height H of the holder 116, respectively.

Figure 17A:
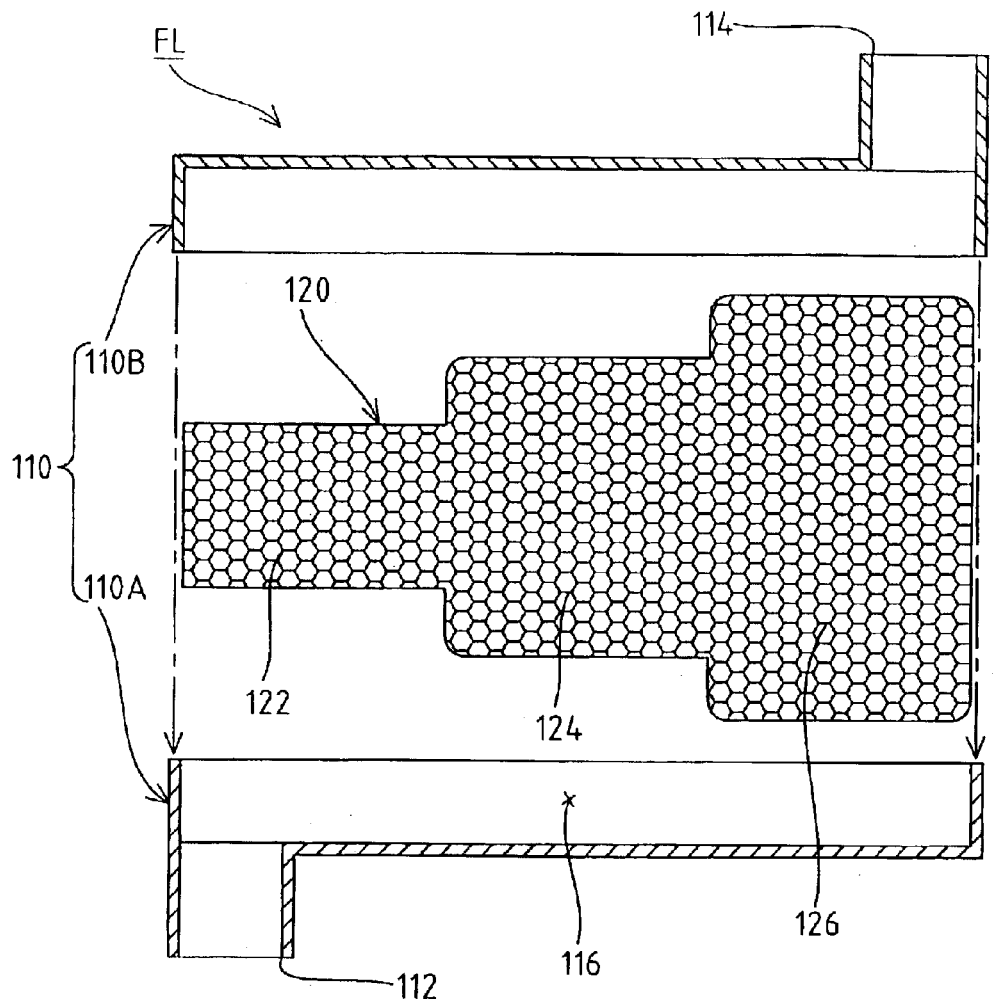
FIG. 17($a$) is a cross-sectional view before a filter case is assembled with a filter medium being located between a first half and a second half.
FIG. 17(b) is a cross-sectional view showing a state where the filter case is assembled with the filter medium being compressed suitably.
Figure 17B:
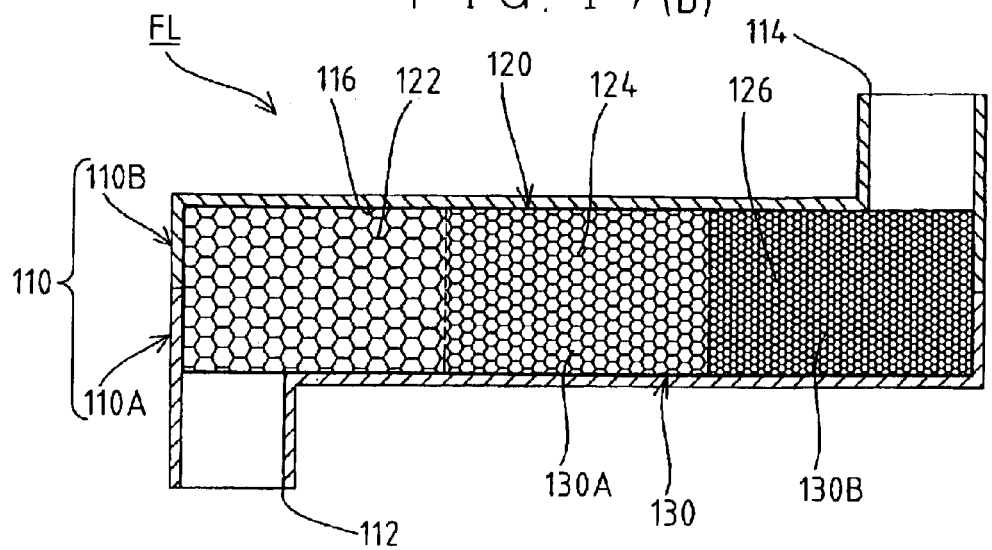
Figure 18:
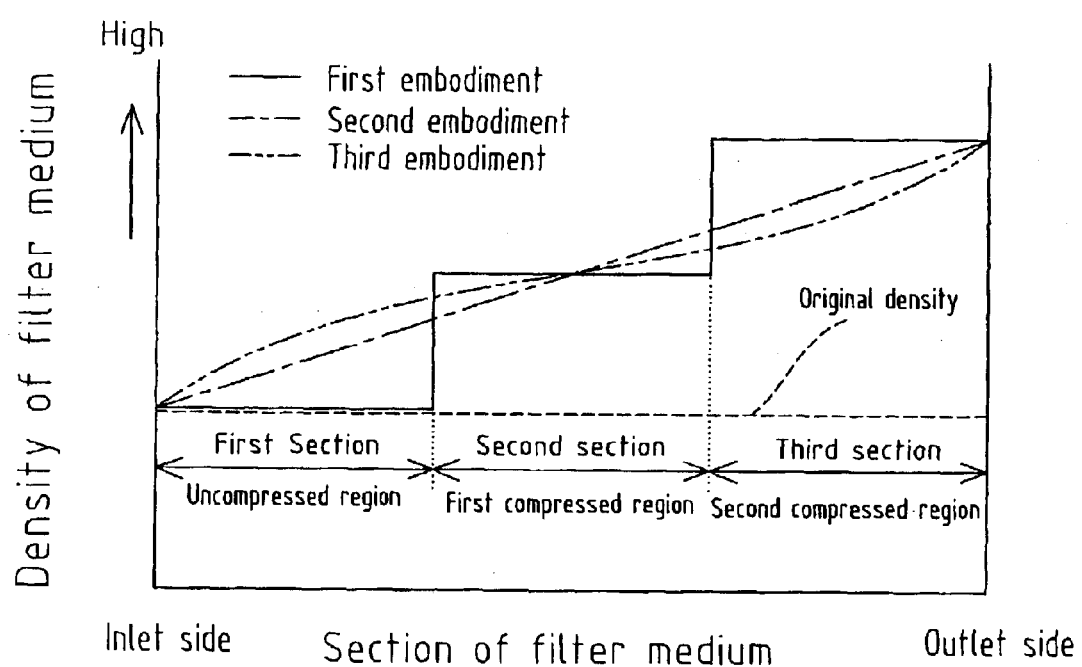
FIG. 18 is a graph showing density distribution curves of the filter mediums in the third to fifth embodiments.

Thus, when the first half 110A and the second half 110B are combined with the filter medium 120 being interposed between them, as shown in FIG. 17(a), the first section 122 is not compressed at all but remains as an uncompressed region, while the second section 124 is compressed to about ½ to form a first compressed region 130A (compressed region 130), and the third section 126 is compressed to about ⅓ to form a second compressed region 130B (compressed region 130), as shown in FIG. 17(b). Therefore, as shown in FIG. 18, provided that the density of the filter medium 120 before it is housed in the holder 116 is the original density (indicated by the broken line), the first section 122 has the original density, while the density of the second section 124 (first compressed region 130A) and that of the third section 126 (second compressed region 130B) are about twice and about three times as much as the original density, respectively (as indicated by the solid line).

As described above, in the fluid filter FL of the third embodiment, the difference in dimension between the filter medium 120 and the holder 116 in the vertical direction of the filter case 110 is designed to increase stepwise (in three steps) from the inlet 112 side toward the outlet 114 side, so that the degree of compression in the compressed region 130 housed in the filter medium 120 increases stepwise from the inlet 112 side toward the outlet 114 side. Thus, in the process that the fluid introduced through the inlet 112 into the holder 116 passes through the filter medium 120 to flow toward the outlet 114, extraneous substances S of relatively large sizes only are captured in the first section 122, and extraneous substances S of medium and small sizes pass through the first section 122. In the second section 124 (first compressed region 130A), the extraneous substances S of medium size passed through the first section 122 are captured, and the extraneous substances S of smaller sizes pass through the second section 124 (first compressed region 130A). Further, in the third section 126 (second compressed region 130B), all the extraneous substances S of small sizes passed through the first section 122 and the second section 124 are completely captured.

Therefore, in the fluid filter FL of the third embodiment, even in the case where various sizes of extraneous substances S are contained in a fluid introduced through the inlet 112 into the filter case 110, extraneous substances S of relatively large sizes are captured in the first section 122 of the filter medium 120 located proximate to the inlet 112, while extraneous substances of smaller sizes are adapted to be captured successively in the second section 124 and the third section 126, respectively. More specifically, even if various sizes of extraneous substances S are contained in the fluid, they are captured in different regions of the filter medium 120 depending on the size, so that extraneous substances S of different sizes can be captured by the filter medium 120 in its entirety, improving the capturing rate favorably. In addition, since extraneous substances S are prevented from being captured massively by a certain part of the filter medium 120, the smooth flow of the fluid passing through the filter medium 120 is maintained to minimize pressure loss.

As described above, in the fluid filter FL of the third embodiment, the urethane foam filter medium 120 obtained by expansion molding to have a uniform density as a whole is designed to have outside dimensions such that the volume of the filter medium 120 is suitably larger than the internal volume of the holder 116 and is housed in the holder 116 in a compressed state so as to form intentionally the compressed region 130 (containing the first compressed region 130A and the second compressed region 130B). Thus, the fluid filter FL, although it uses a single filter medium 120, can exhibit capturing performance equivalent to or higher than the case where a plurality of filter mediums of different densities (different capturing rates) are used. Thus, the rate of capturing extraneous substances S can be improved favorably at a low cost.

It should be noted here that the densities of the first section 122 (uncompressed region), the second section 124 (first compressed region 130A) and of the third section 126 (second compressed region 130B) are illustrated to change abruptly at the borders between them in FIGS. 14, 15, 17(b) and 18, the density of the filter medium 120 is actually adapted to change gradually at the borders between 122, 124 and 126.

Further, if slits of suitable depths are formed at the border between the first section 122 and the second section 124 and at the border between the second section 124 and the third section 126 respectively, the compression deformation of the second section 124 and that of the third section 126 are prevented from affecting directly the first section 122 and the second section 124, respectively.

(Fourth Embodiment)

Figure 19:
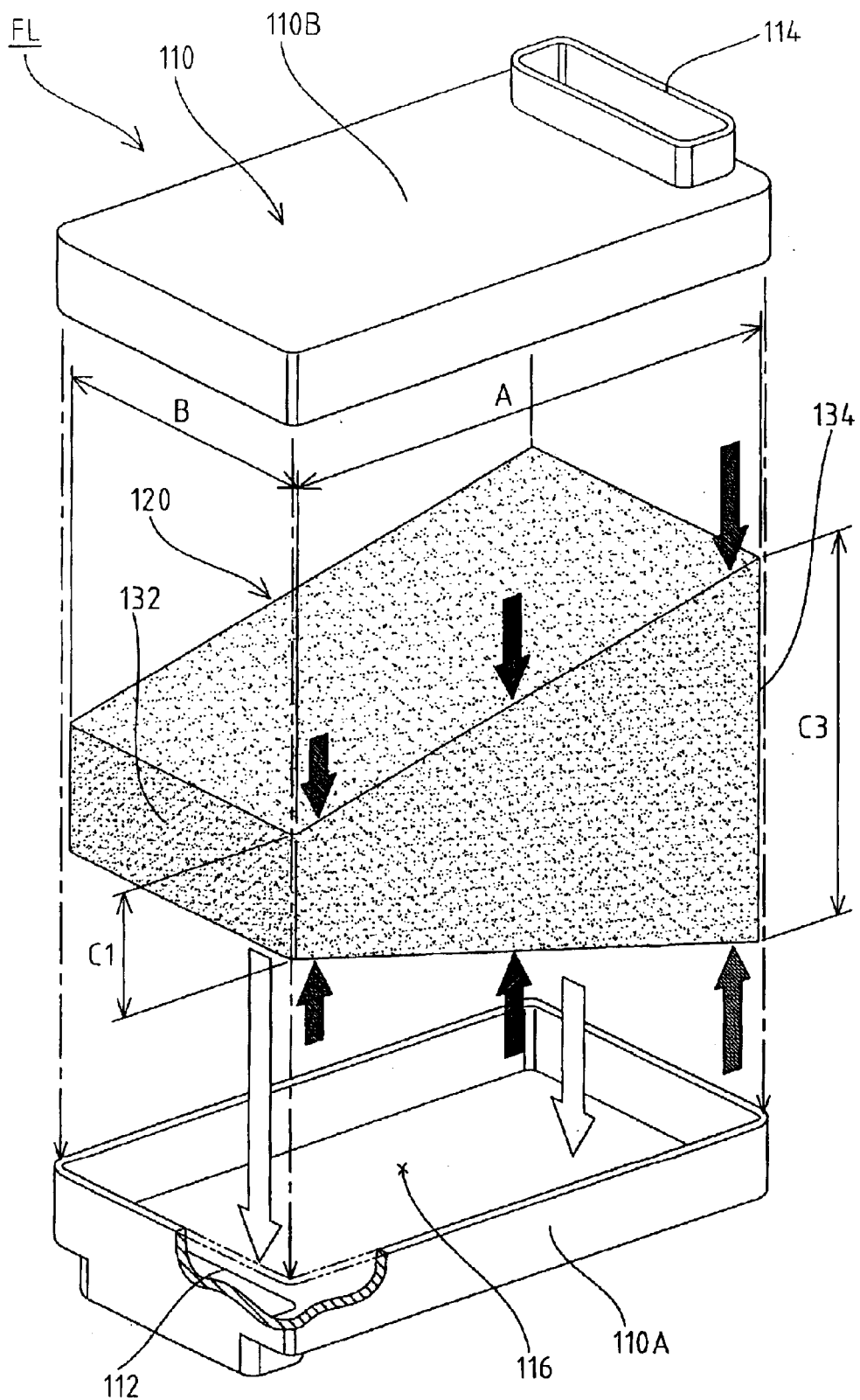
FIG. 19 is an exploded perspective view of a fluid filter according to a fourth embodiment of the present invention.
Figure 20A:
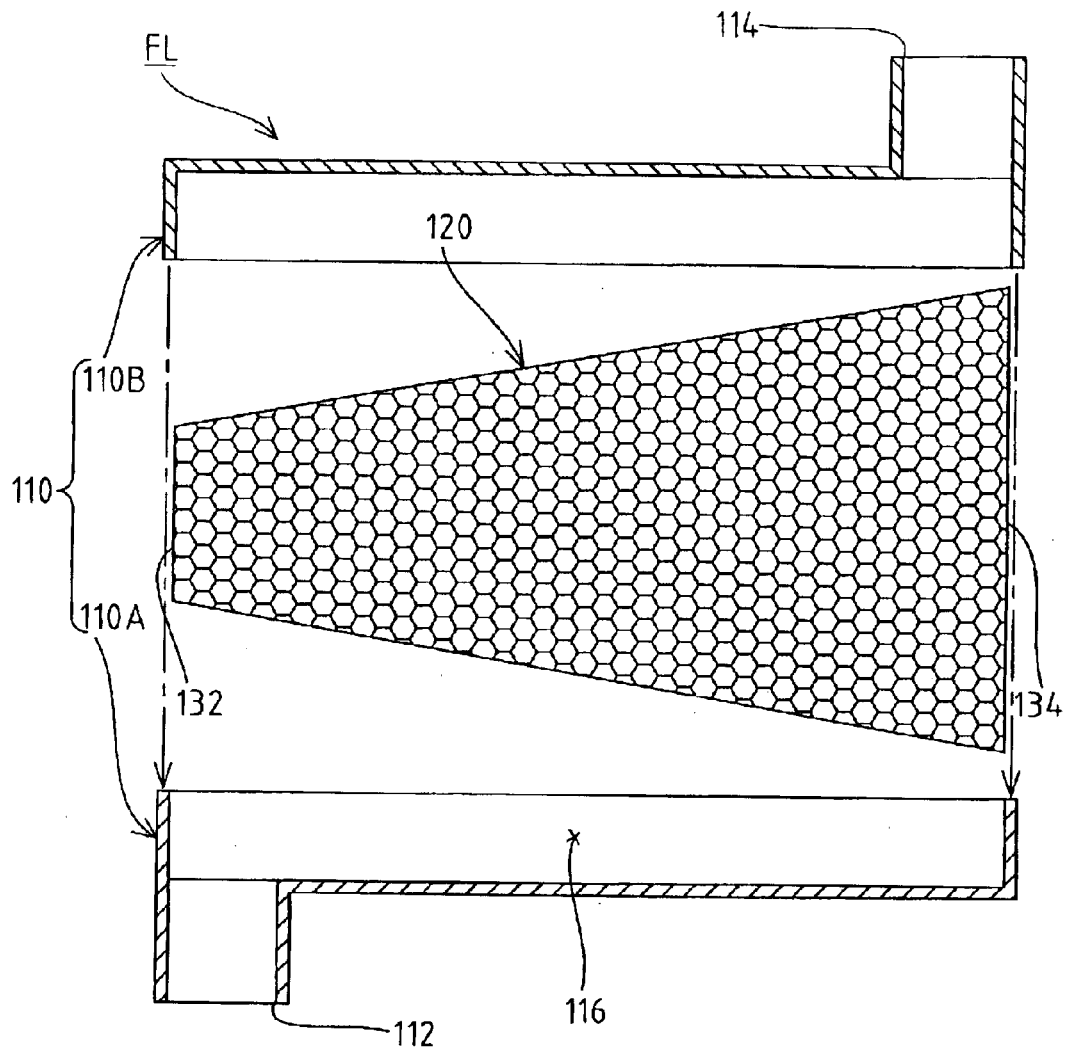
FIG. 20(a) is a cross-sectional view before a filter case is assembled with a filter medium being located between a first half and a second half.

FIG. 19 is an exploded perspective view of a fluid filter according to a fourth embodiment of the present invention; FIG. 20(a) is a vertical cross-sectional side view showing schematically how the fluid filter FL of the fourth embodiment is assembled. The fluid filter FL of the fourth embodiment uses the same filter case 110 as used in the third embodiment, and the profile of the filter medium 120 is changed. The length A and the width B of the filter medium 120 are designed to be basically the same as the length L and the width W of the holder 116, and only the thickness C of the former is designed to be suitably greater than the height H of the latter. More specifically, a first end 132 of the filter medium 120 located proximate to the inlet 112 is designed to have a thickness C1 substantially the same as the height H of the holder 116, while a second end 134 located proximate to the outlet 114 is designed to have a thickness C3 about three times as much as the height H of the holder 116, and the thickness of the filter medium 120 is adapted to increase gradually from the first end 132 toward the second end 134 so that the filter medium 120 assumes a so-called trapezoidal shape. In other words, in the fluid filter FL of the fourth embodiment, the difference in dimension between the filter medium 120 and the holder 116 in the vertical direction of the filter case 110 is designed to increase continuously or linearly from the inlet 112 side toward the outlet 114 side.

Figure 20B:
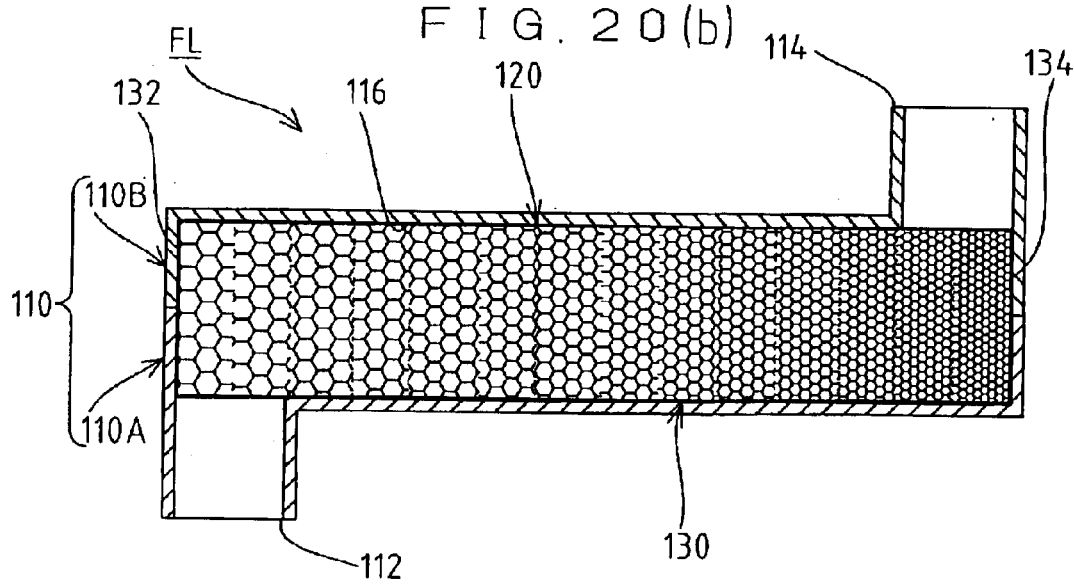
FIG. 20(b) is a cross-sectional view showing a state where the filter case is assembled with the filter medium being compressed suitably.

Thus, when the first half 110A and the second half 110B are combined with the filter medium 120 being interposed between them as shown in FIG. 20(a), the portion of the filter medium 120 around the first end 132 located proximate to the inlet 112 is not compressed substantially, but the degree of compression increases gradually (continuously) proportional to the distance from the first end 132. The filter medium 120 is compressed to about ½ in the middle part and further to about ⅓ in the portion around the second end 134 located proximate to the outlet 114, as shown in FIG. 20(b). Therefore, the degree of compression in the compressed region 130 formed in the filter medium 120 housed in the holder 116 increases continuously from the inlet 112 side toward the outlet 114 side, and the density of the filter medium 120 increases continuously from the inlet 112 side toward the outlet 114 side, as indicated by the dash and dotted line in FIG. 18, such that the filter medium 120 has the original density at around the first end 132 and about a triple density at around the second end 134.

Therefore, in the fluid filter FL of the fourth embodiment, even in the case where various sizes of extraneous substances S are contained in a fluid introduced through the inlet 112 into the filter case 110, relatively large sizes of extraneous substances S are captured in the region of the filter medium 120 located proximate to the inlet 112, and the size of extraneous substances to be captured by the filter medium 120 reduces successively toward the outlet 114. More specifically, even if various sizes of extraneous substances S are contained in a fluid, they are captured in different regions of the filter medium 120 depending on the size, so that extraneous substances S are captured by the filter medium 120 in its entirety, improving the capturing rate favorably. In addition, since extraneous substances S are prevented from being captured massively by a certain part of the filter medium 120, the smooth flow of the fluid passing through the filter medium 120 is maintained to minimize pressure loss.

(Fifth Embodiment)

Figure 21:
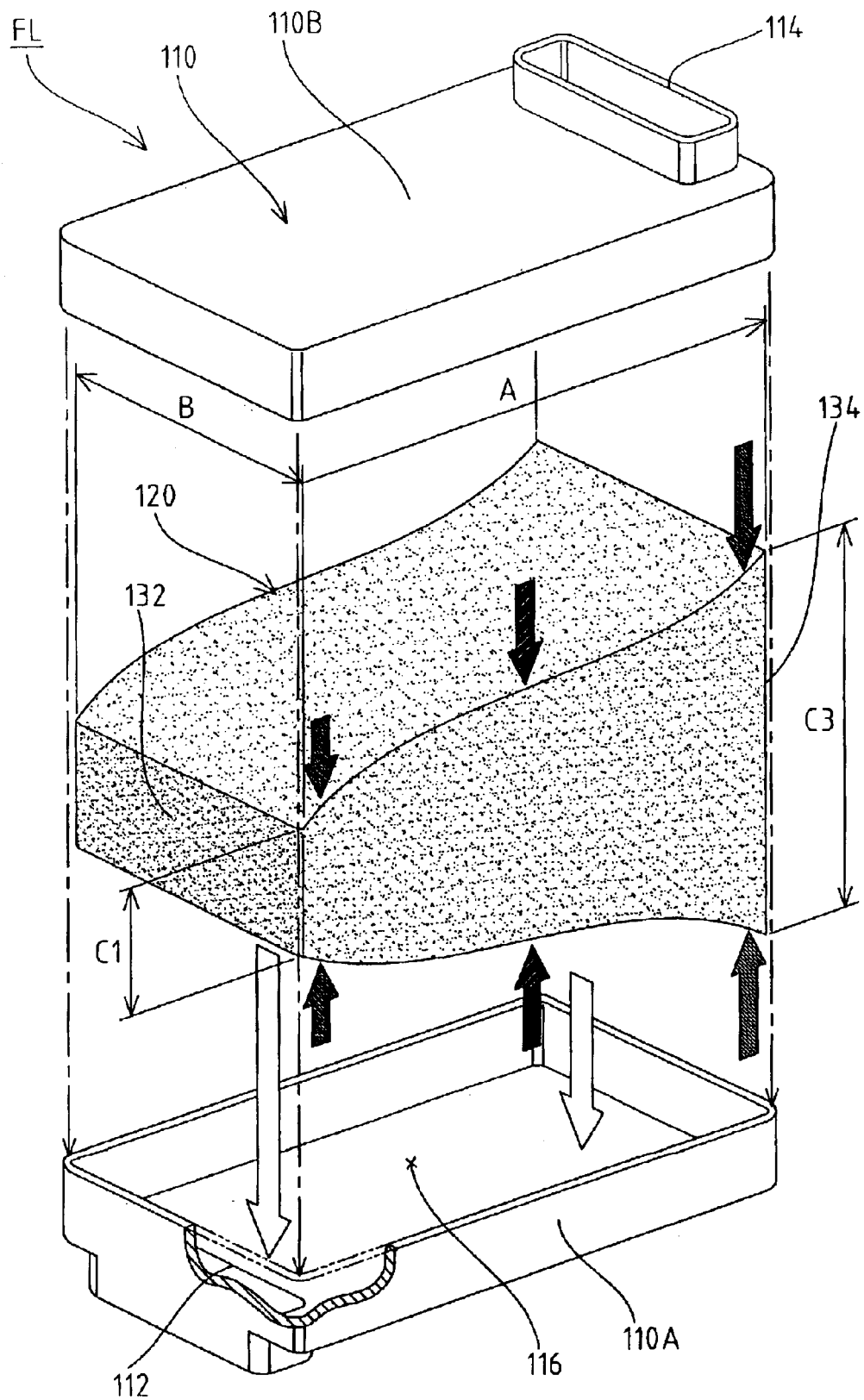
FIG. 21 is an exploded perspective view of the fluid filter according to a fifth embodiment of the present invention.
Figure 22A:
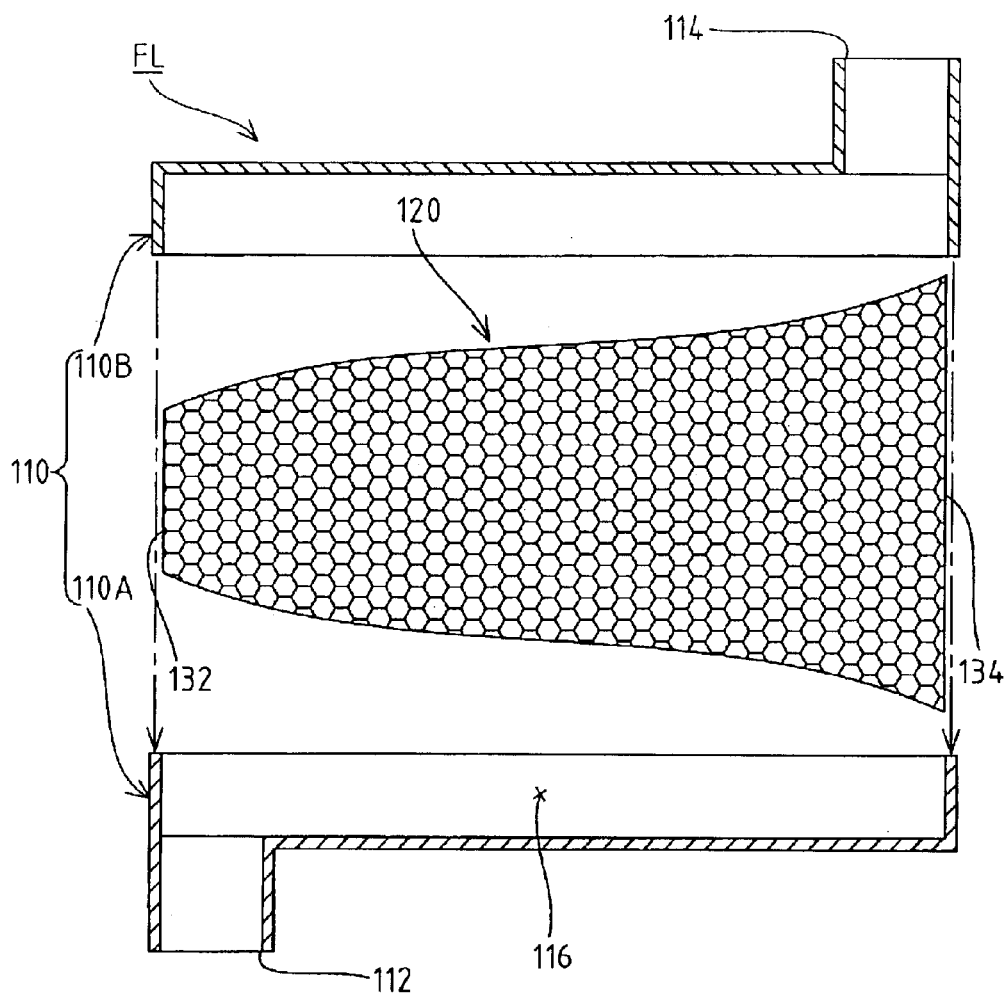
FIG. 22(a) is a cross-sectional view before a filter case is assembled with a filter medium being located between a first half and a second half.

FIG. 21 is an exploded perspective view of a fluid filter according to a fifth embodiment of the present invention; FIG. 22(a) is a vertical cross-sectional side view showing schematically how the fluid filter FL of the fifth embodiment is assembled. In the fluid filter FL of the fifth embodiment, there is no change in the filter case 110, but only the shape of the filter medium 120 is changed. The length A and the width B of the filter medium 120 are designed to be basically the same as the length L and the width W of the holder 116, and only the thickness C of the former is designed to be suitably greater than the height H of the latter. More specifically, the first end 132 of the filter medium 120 located proximate to the inlet 112 is designed to have a thickness C1 substantially the same as the height H of the holder 116, while the second end 134 located proximate to the outlet 114 is designed to have a thickness C3 of about three times as much as the height H of the holder 116, and the thickness of the filter medium 120 is adapted to increase irregularly from the first end 132 toward the second end 134 so that the filter medium 120 assumes a so-called streamline. In other words, in the fluid filter FL of the fifth embodiment, the difference in dimension between the filter medium 120 and the holder 116 in the vertical direction of the filter case 110 is designed to increase continuously and nonlinearly (curvilinearly) from the inlet 112 side toward the outlet 114 side.

Figure 22B:
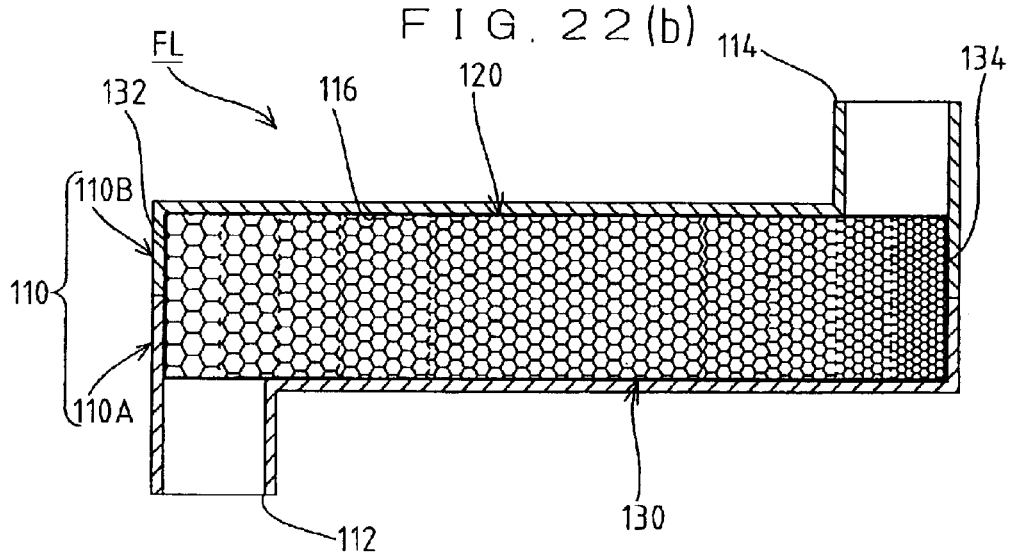
FIG. 22(b) is a cross-sectional view showing a state where the filter case is assembled with the filter medium being compressed suitably.
Figure 23:
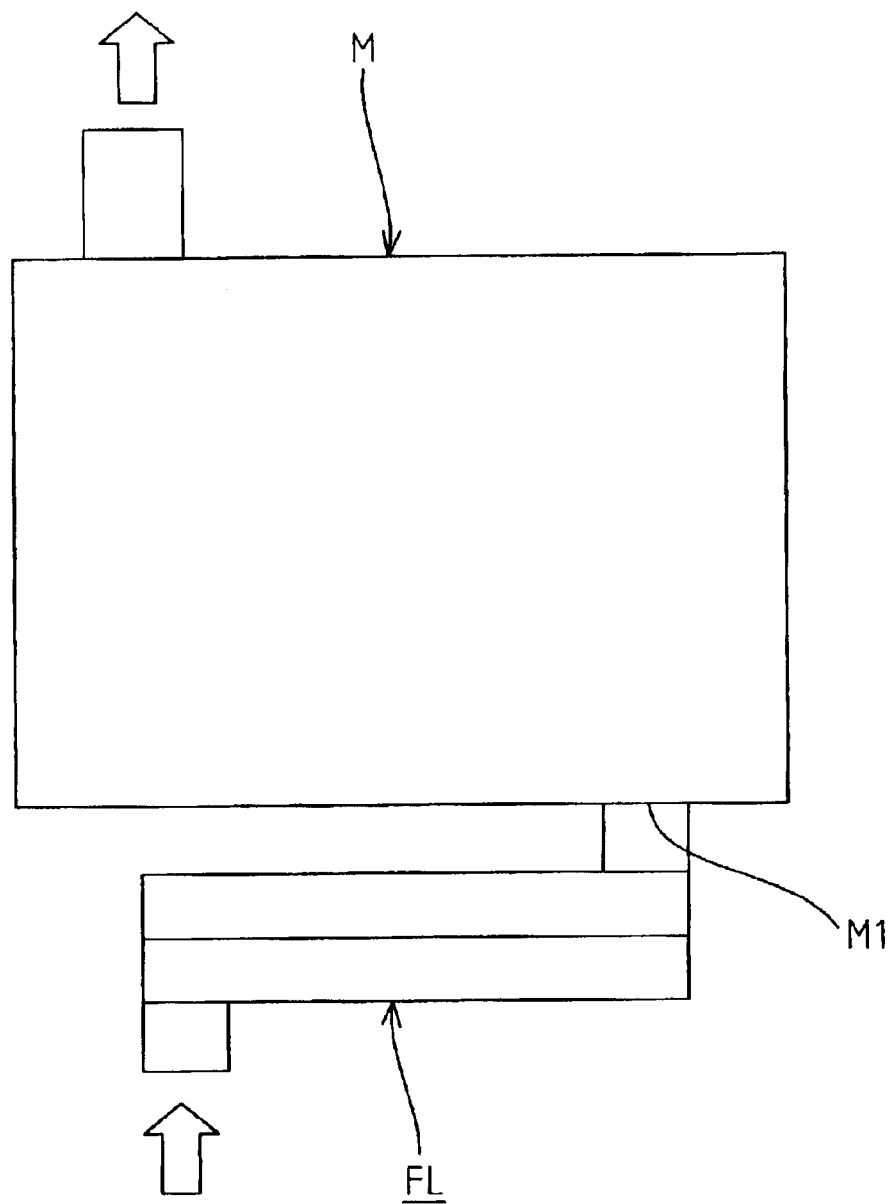
FIG. 23 is a schematic view of an apparatus having a fluid filter attached thereto.

Thus, when the first half 110A and the second half 110B are combined with the filter medium 120 being interposed between them as shown in FIG. 22(a), the portion of the filter medium 120 around the first end 132 located proximate to the inlet 112 is not compressed substantially, but the degree of compression increases irregularly from the first end 132 toward the second end 134 such that the filter medium 120 is compressed to about ⅓ in the portion around the second end 134 located proximate to the outlet 114, as shown in FIG. 22(b). Therefore, the degree of compression of the compressed region 130 formed in the filter medium 120 housed in the holder 116 in a compressed state increases irregularly from the inlet 112 side toward the outlet 114 side, and the density of the filter medium 120 increases irregularly from the inlet 112 side toward the outlet 114 side, as indicated by the chain double-dashed line in FIG. 18, provided that the filter medium 120 has the original density at around the first end 132 and about a triple density at around the second end 134.

In the fluid filter FL of the fifth embodiment having the constitution as described above, even in the case where various sizes of extraneous substances S are contained in a fluid introduced through the inlet 112 into the filter case 110, relatively large sizes of extraneous substances S are captured in the region of the filter medium 120 located proximate to the inlet 112, and the size of the extraneous substances to be captured by the filter medium 120 reduces successively toward the outlet 114. More specifically, even if various sizes of extraneous substances S are contained in a fluid, they are captured in different regions of the filter medium 120 depending on the size, so that extraneous substances S are captured by the filter medium 120 in its entirety, improving the capturing rate favorably. In addition, since extraneous substances S are prevented from being captured massively by a certain part of the filter medium 30, the smooth flow of the fluid passing through the filter medium 30 is maintained to minimize pressure loss.

It should be noted here that while the fluid filters FL according to the present invention illustrated in the first to fifth embodiments each assume a rectangular shape, the shape of the fluid filter FL is not limited to it but may of course be formed to have various shapes and dimensions depending on the properties of fluid (gas or liquid) to be treated, properties of extraneous substances contained in the fluid (size etc.), shape and dimensions of the filter case (20,110), material of the filter medium (30,120) and various other conditions.

Meanwhile, the porous material constituting the filter mediums 30 and 120 to be employed in the fluid filters of the present invention are not to be limited to urethane foam having an open-cell structure as illustrated in the respective embodiments, but there are other porous materials which can be employed suitably, including synthetic resin open-cell foams such as of rubbers and plastics (including those obtained by means of extraction), nonwoven fabrics, fiber assemblies (such as of plastics, inorganic materials and metals).

Effect of the Invention

As has been described heretofore, according to the fluid filter of the present invention, the pressing portions formed within the filter case are pressed against the external surface of a single (one kind of) filter medium made of a porous material molded to have a uniform density, and thus a compressed region can be formed in the filter medium intentionally, where the rate of capturing extraneous substances S is increased. Even the use of the single filter medium can show the same or high level of capturing performance compared with the case where a plurality of filter mediums of different capturing rates are used. Since the degree of compression of the compressed region in the filter medium changes depending on the height of each pressing portion, the present invention exhibits an extremely useful effect of improving the rate of capturing extraneous substances at a low cost. Besides, even if extraneous substances contained in a fluid differ in size, they are captured in different regions of the filter medium depending on the size, so that they are captured by the filter medium in its entirety evenly. Thus, extraneous substances S are prevented from being captured massively by a certain part of the filter medium 30, so that the smooth flow of the fluid passing through the filter medium 30 is advantageously maintained to minimize pressure loss.

The compressed region can be suitably formed in the filter medium according to a mode, in which the pressing portions are ribs formed in the case body or ridges constituting the bottom of the case body, and the pressing portions are formed on one side in the holder defined within the case body to compress the filter medium from one side, or they may be formed on both sides in the holder to compress the filter medium from both sides.

Further, according to the fluid filter of the present invention, extraneous substances contained in a fluid introduced into the case body can partly be allowed to settle into the empty spaces defined in the case body, so that the amount of extraneous substances captured by the filter medium to remain therein can be reduced proportionally. Thus, the period (duration) until occurrence of clogging of the filter medium is extended to extend also the cycle of replacing or cleaning the filter medium, enabling reduction of troublesome operations of replacing or cleaning the filter medium and also curtailment of running cost, advantageously.

Extraneous substances can be captured effectively by using as the filter medium a synthetic resin open-cell foam having an open-cell structure, a nonwoven fabric, a fiber assembly and the like.

Meanwhile, in the fluid filter according to another aspect of the present invention, the filter medium having a uniform density as a whole is designed to have dimensions such that the volume of the filter medium is suitably larger than the internal volume of the holder defined in the case body so that the filter medium is housed in the holder in a compressed state to form a compressed region having an increased rate of capturing extraneous substances at a desired position. Thus, even the use of the single filter medium can show the same or high level of capturing performance compared with the case where a plurality of filter mediums of different densities (different capturing rates) are used. Thus, the rate of capturing extraneous substances can be improved favorably at a low cost, advantageously.

If the difference in dimension between the filter medium and the holder is designed to increase from the inlet side toward the outlet side of the case body, various sizes of extraneous substances S if contained in a fluid are captured in different regions of the filter medium depending on the size. Thus, the extraneous substances are captured by the filter medium in its entirety, improving the capturing rate advantageously.

Extraneous substances can be captured effectively by using as the filter medium a synthetic resin open-cell foam having an open-cell structure, a nonwoven fabric, a fiber assembly and the like.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A fluid filter provided with a case body and a filter medium; the case body having an inlet and an outlet for a fluid at necessary positions respectively and containing a holder defined therein to communicate with the inlet and the outlet; the filter medium being made of a porous material having an appropriate flexibility and a uniform density when not compressed and being removably housed in the holder so as to allow the fluid introduced through the inlet in the holder to pass through the filter medium where fine extraneous substances contained in the fluid are captured and to discharge the thus cleaned fluid through the outlet;

wherein the case body comprises a plurality of pressing portions formed on an internal surface of the case body, the plurality of pressing portions for compressing the filter medium housed in the holder; the plurality of pressing portions being pressed against the filter medium housed in the holder to compress it and form a plurality of compressed regions having an increased rate of capturing extraneous substances, enabling the filter medium to capture the extraneous substances throughout the filter medium even if the extraneous substances differ in size and wherein said plurality of pressing portions comprise a plurality of ribs formed in the case body.

2. The fluid filter according to claim 1, wherein the degree of compression in each of the plurality of compressed regions in the filter medium is set depending on the height of each of the plurality of ribs such that the higher is the degree of compression of the compressed region, the higher becomes the rate of capturing the extraneous substances.

3. The fluid filter according to claim 1, wherein the plurality of pressing portions are formed to be arranged parallelwise at suitable intervals from the inlet side toward the outlet side, so that ones of the plurality of the pressing portions located proximate to the inlet and ones of the plurality of pressing portions located proximate to the outlet are designed to be the lowest and the highest respectively and that the degree of compression of the compressed region increases gradually from the inlet side toward the outlet side.

4. The fluid filter according to claim 1, wherein the plurality of pressing portions are formed parallelwise on one side of the holder so as to compress the filter medium from one side.

5. The fluid filter according to claim 1, wherein the plurality of pressing portions are arranged parallelwise from the inlet side toward the outlet side to define empty spaces between the holder and the filter medium and adjacent to the respective plurality of pressing portions so as to allow extraneous substances captured by the filter medium to partly settle into empty spaces.

6. The fluid filter according to claim 5, wherein a fluid introduced into the holder is party or entirely allowed to impinge upon the plurality of pressing portions to let the fluid dwell in the empty spaces for a while so that the extraneous substances contained in the fluid settle into the empty spaces.

7. The fluid filter according to claim 1, wherein the filter medium is made of a synthetic resin open-cell foam having an open-cell structure, a nonwoven fabric or a fiber assembly.

* * * * *